United States Patent
Wang et al.

(10) Patent No.: US 11,737,134 B2
(45) Date of Patent: Aug. 22, 2023

(54) METHOD AND APPARATUS FOR DATA TRANSMISSION

(71) Applicant: Samsung Electronics Co., Ltd., Suwon-si (KR)

(72) Inventors: Yi Wang, Beijing (CN); Yingyang Li, Beijing (CN); Shichang Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/053,474

(22) PCT Filed: May 7, 2019

(86) PCT No.: PCT/KR2019/005423
§ 371 (c)(1),
(2) Date: Nov. 6, 2020

(87) PCT Pub. No.: WO2019/216619
PCT Pub. Date: Nov. 14, 2019

(65) Prior Publication Data
US 2021/0160919 A1 May 27, 2021

(30) Foreign Application Priority Data

May 10, 2018 (CN) .......................... 201810445817.8
Aug. 9, 2018 (CN) .......................... 201810908376.0
(Continued)

(51) Int. Cl.
*H04W 74/00* (2009.01)
*H04L 1/1829* (2023.01)
(Continued)

(52) U.S. Cl.
CPC ......... *H04W 74/002* (2013.01); *H04L 1/1854* (2013.01); *H04L 5/0055* (2013.01); *H04W 74/08* (2013.01)

(58) Field of Classification Search
CPC . H04W 74/002; H04W 74/08; H04W 74/008; H04W 74/004; H04W 74/006;
(Continued)

(56) References Cited

U.S. PATENT DOCUMENTS

2015/0237626 A1   8/2015   Li et al.
2017/0019909 A1   1/2017   Si et al.
(Continued)

FOREIGN PATENT DOCUMENTS

CN   106656428 A   5/2017
CN   107567720 A   1/2018
(Continued)

OTHER PUBLICATIONS

3rd Generation Partnership Project; Technical Specification Group Radio Access Network; NR; Physical layer procedures for control (Release 15), 3GPP TS 38.213 V15.1.0, Apr. 8, 2018.
(Continued)

*Primary Examiner* — Min Jung
(74) *Attorney, Agent, or Firm* — Jefferson IP Law, LLP

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure discloses a method and an
(Continued)

apparatus for data transmission. The method comprises: performing data transmission in a listen-before-talk mode; obtaining HARQ-ACK information of transmitted data bursts; and adjusting a contention window size CWS for carrier sensing to be performed before transmission of a next data burst based on HARQ-ACK information of reference data, wherein the reference data refers to a chosen PDSCH or PUSCH in a reference slot in a reference data burst selected from the transmitted data bursts. The method of the present disclosure may effectively reduce transmission collision between different nodes.

6 Claims, 27 Drawing Sheets

(30) Foreign Application Priority Data

Sep. 26, 2018 (CN) .......................... 201811127725.1
Dec. 28, 2018 (CN) .......................... 201811632534.0

(51) Int. Cl.
*H04L 5/00* (2006.01)
*H04W 74/08* (2009.01)

(58) Field of Classification Search
CPC ... H04L 1/1854; H04L 1/1861; H04L 1/1614; H04L 1/1812
See application file for complete search history.

(56) References Cited

U.S. PATENT DOCUMENTS

| | | |
|---|---|---|
| 2017/0055296 A1 | 2/2017 | Cheng et al. |
| 2017/0111888 A1 | 4/2017 | Dinan |
| 2017/0171883 A1 | 6/2017 | Noh et al. |
| 2018/0027554 A1 | 1/2018 | Yerramalli et al. |
| 2018/0288790 A1 | 10/2018 | Kim et al. |
| 2019/0007972 A1 | 1/2019 | Gou et al. |
| 2019/0110310 A1 | 4/2019 | Obregon et al. |
| 2019/0174546 A1* | 6/2019 | Jeon .................. H04W 74/0816 |
| 2019/0182865 A1* | 6/2019 | Falahati ................. H04L 1/1822 |
| 2019/0215866 A1* | 7/2019 | Falahati .............. H04W 72/0446 |
| 2020/0344819 A1* | 10/2020 | Myung ................. H04L 5/0055 |
| 2021/0195639 A1* | 6/2021 | Kim ...................... H04W 72/14 |

FOREIGN PATENT DOCUMENTS

| | | |
|---|---|---|
| CN | 107852752 A | 3/2018 |
| KR | 10-2015-0079939 A | 7/2015 |
| KR | 10-2018-0049100 A | 5/2018 |
| WO | 2017/030417 A1 | 2/2017 |
| WO | 2017/030491 A1 | 2/2017 |
| WO | 2017/126935 A1 | 7/2017 |
| WO | 2017/184071 A1 | 10/2017 |

OTHER PUBLICATIONS

LTE; Evolved Universal Terrestrial Radio Access (E-UTRA); Physical layer procedures (3GPP TS 36.213 version 14.6.0 Release 14), ETSI TS 136 213 V14.6.0, Apr. 19, 2018, pp. 1-468, XP014319742, Sophia-Antipolis, France.
European Search Report dated Nov. 17, 2021, issued in European Application No. 19798997.3.
Indian Office Action dated Feb. 24, 2022, issued in Indian Application No. 202037048785.
Notice of Allowance dated Nov. 14, 2022, issued in Korean Application No. 0-2020-7032476.
European Office Action dated Jan. 27, 2023, issued in European Application No. 19798997.3.
Chinese Office Action dated Apr. 5, 2023, issued in Chinese Application No. 201811632534.0.

* cited by examiner

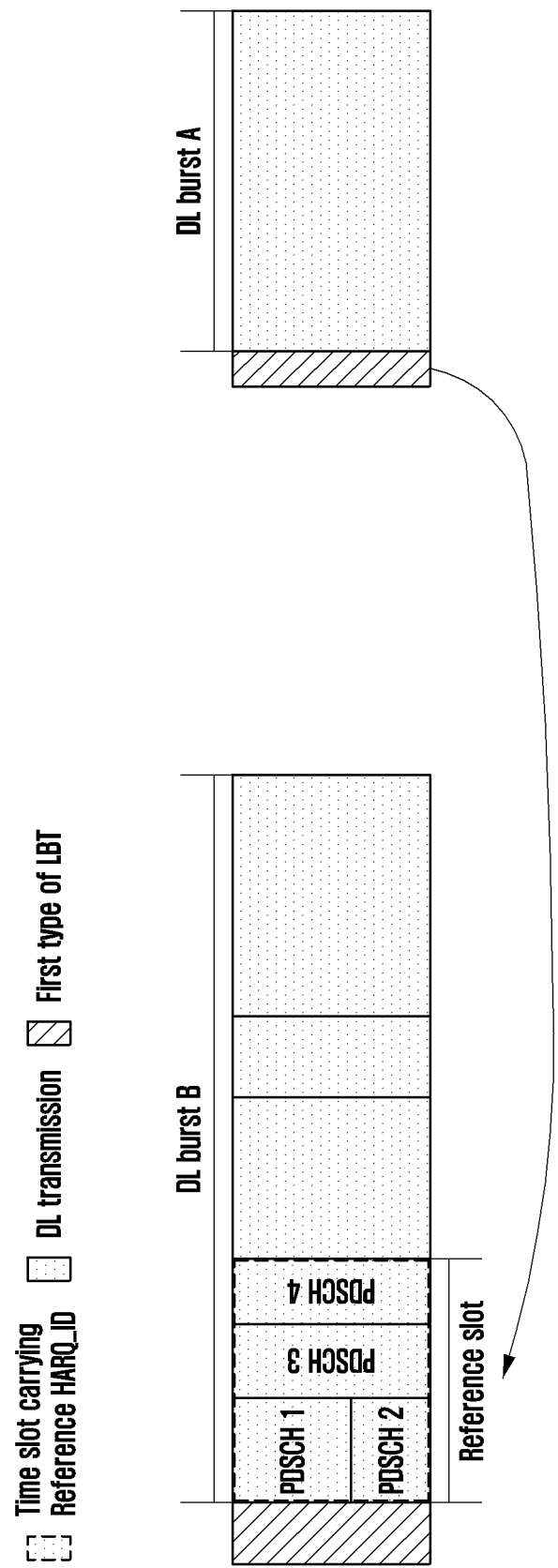

FIG. 15
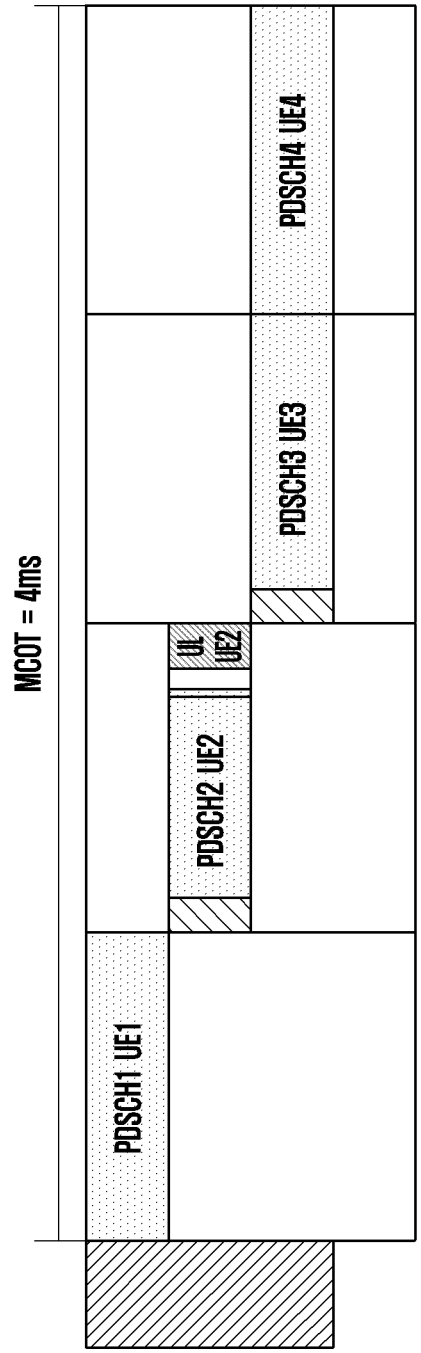
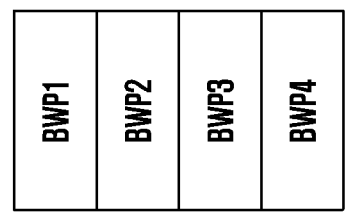

FIG. 16
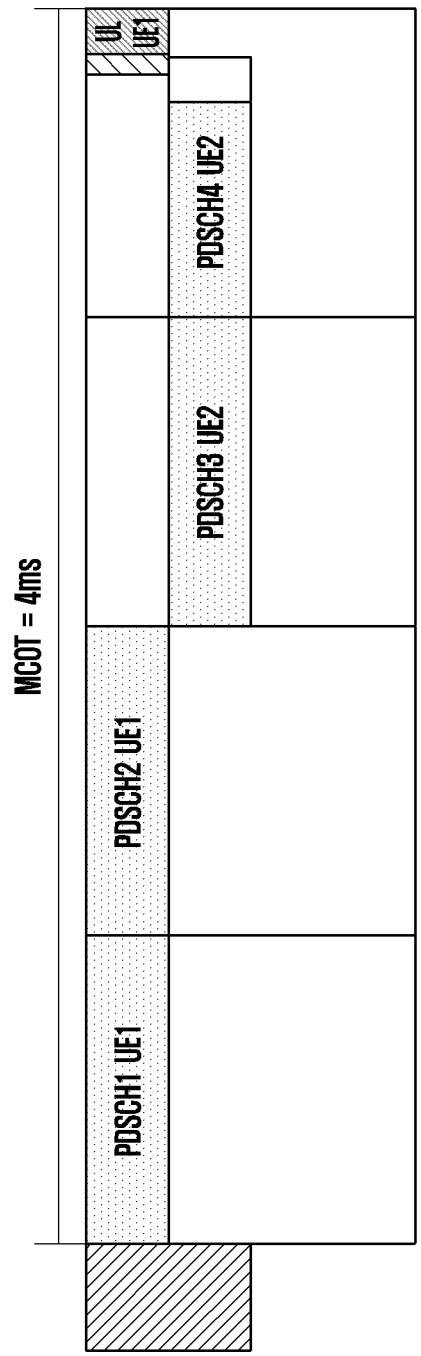
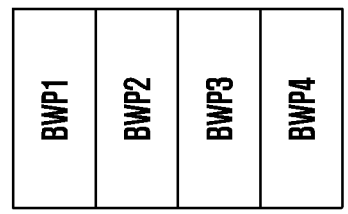

METHOD AND APPARATUS FOR DATA TRANSMISSION

TECHNICAL FIELD

Embodiments of the present disclosure generally relate to the mobile communication technologies, and more particularly relate to a method of carrier-sensing-based signal transmission and an apparatus therefor.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

To satisfy gigantic traffic demands, 5G communication systems are expected to work on resources in a range from a low frequency band to a high frequency band of about 100G, including licensed frequency bands and unlicensed frequency bands. For the unlicensed frequency bands, a 5 GHz frequency band and a 60 GHz frequency band are mainly considered. 5G systems working on the unlicensed frequency bands are referred to as NR-U systems, including a scenario of independently working on unlicensed frequency bands, a scenario of working on the licensed frequency bands via dual connectivity (DC), and a scenario of working on licensed frequency bands via carrier aggregation (CA). The 5 GHz frequency band has been deployed with an 802.11-series WiFi (Wireless Fidelity) system, a radar and an LTE Licensed-Assisted Access (LAA) system, all of which follow an LBT (Listen before Talk) mechanism, i.e., compulsorily detecting a radio channel before transmitting a signal, and only when the radio channel is detected to be idle, can it be occupied to send signals. The 60 GHz frequency band has also been deployed with an 802.11ay system, which is also needed to follow the LBT mechanism. For other unlicensed frequency bands, an effective coexistence mode needs to be formulated according to corresponding specifications.

The LBT mechanism may be categorized into two types. The first type of LBT is generally referred to as Category 4 LBT (TS 36.213 15.2.1.1), for determining a contention window size (CWS) and randomly generating a back-off factor X. If X carrier sensing slots (CCA slots) are all idle, signals may be transmitted. The first type of LBT is divided into four LBT priority classes which correspond to different QCIs (Quality Criterion Indicators), respectively. Different LBT priority classes have different CWS sizes (i.e., different value sets of CWs), different defer periods (equal to 16+9*n microseconds, where n is an integer greater than or equal to 1), and different maximum channel occupancy times (MCOT), as shown in Table 1 below. The other type is referred to a second type of BLT (TS 26.213 15.2.1.2), where a transmitter is only needed to perform a 25 μs CCA (Clear Channel Assessment) detection once before the start of standard-defined signal transmission; if the channel is clear, signals may be transmitted.

TABLE 1

Value Set of the CWSs Corresponding to LBT Priority Classes, MCOT, and Defer Parameter n

| LBT Priority Classes | n | $CW_{minimum}$ | $CW_{maximum}$ | MCOT | Set of CWSs (Value Set of CWp) |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The first type of LBT requires that the transmitter continue detecting clearness of X number of CCA slots after detecting clearness of a defer period, where X is an integer randomly selected in a range from 0 to a CWp in a CWS set. Although collisions among transmitting parties may be reduced by respective transmitting parties randomly selecting a number in the CWS set as a back-off factor X, it still possibly occurs that a plurality of transmitting parties select the same X and simultaneously satisfy the requirement that the X number of CCA slots be clear such that the plurality of transmitting parties simultaneously start transmitting signals. Or even their back-off factors X are different, since the start time of their performance of CCA and the conditions of their surrounding interferences are different, it still occurs that they simultaneously satisfy the requirement that the X number of CCA slots respectively generated by themselves be all clear and then they start sending signals simultaneously. By determining whether collision occurs in the last transmission based on a decoding result (e.g., HARQ-ACK feedback result) of the data signal (e.g., PDSCH or PUSCH) transmitted in the last time, whether to adjust the CWS for the current time of transmission may be determined, thereby reducing the possibility of further collision between these transmitting parties in the next time of transmission. By enlarging the value scope of CWS, the probability of two or more transmitting parties simultaneously performing the LBT decreases along therewith. In the prior art, adjustment of the CWS is determined based on a PDSCH/PUSCH HARQ-ACK result of the index (HARQ_ID) of a reference HARQ procedure. If a percentage of the amount of ACKs in the PDSCH/PUSCH HARQ-ACK or the amount of equivalent NDIs (New Data Indications) toggled in the UL grant to the amount of all HARQ-ACKs or the amount of all equivalent NDIs exceeds a predefined threshold, the value of CWS is reset, i.e., CWp=CWminimum; otherwise, the value range of CWSs increases to a next larger optional value. For example, if the LBT priority class is Category III, and the last CWp is 63 in the CWS set {15, 31, 63, 127, 255, 511, 1023}, then the value of CWp for this time should be 127. For example, to adjust the CWS for downlink transmission, the PDSCH corresponding to the reference HARQ_ID refers to PDSCHs of all downlink transmissions in the first downlink subframe of one downlink burst as last transmitted by the base station after performing the first type of LBT, and the base station is expected to have received the HARQ-ACKs of these PDSCHs. The threshold value is 20%. The downlink burst refers to downlink transmission of one or more subframes successively transmitted by the base station after performing the first type of LBT, where no gap exists between all downlink transmissions in one downlink burst and LBT needs not be performed by the base station between these downlink transmissions either. For another example, for adjusting the CWS for uplink transmission, the PUSCH corresponding to the reference HARQ_ID refers to the PUSCH of the first uplink subframe located in the uplink burst (the definition of the uplink burst is similar to the downlink burst) transmitted by a UE after performing the first type of LBT, and the uplink burst is at least 4 subframes earlier than the UL grant or the downlink control information (AUL-DFI) including the PUSCH HARQ-ACK information. The threshold value is 0.

In the prior art, for a UE, one subframe only has up to one PDSCH or one PUSCH, and for the HARQ-ACK feedback corresponding to the one PDSCH or one PUSCH, one transport block (TB) of each PDSCH or PUSCH has a 1-bit HARQ-ACK; besides, the resources (namely, system bandwidths) for performing the LBT before each time of transmission are identical. In the 5G system or in other new systems, one subframe or one slot for a UE may include a plurality of PDSCHs or PUSCHs, and the HARQ-ACK feedback of the PDSCH or the PUSCH may be based on TB or based on CBG (code block group).

Moreover, the 5G system introduces the concept of BWP (bandwidth part), where reception and transmission of a UE is performed in a same BWP. The downlink reception is performed on the DL BWP, and the uplink transmission is performed on the UL BWP. One BWP may be equivalent to the system bandwidth of the carrier or a part of the system bandwidth. The base station may configure a plurality of BWPs for a UE; however, the UE can only perform transmission or reception on one BWP each time. Such a BWP is referred to as an active BWP. The base station may dynamically indicate an active BWP through dynamic signaling (e.g., DL grant or UL grant that schedules the downlink or uplink data) or fallback to a default BWP through a predefined timer. Of course, it is not excluded that a competent UE in the 5G system or other systems may perform reception or transmission simultaneously on a plurality of BWPs. The frequency domain resources occupied by the BWPs of respective UEs may be identical or different. The frequency domain resources occupied by the UE BWPs are different, which has the following scenarios: the frequency domain resources overlap but not completely overlap, or do not overlap at all. The bandwidths of UE BWPs may be identical or different. At the base station side, the base station may generally perform transmission and reception on a plurality of UE BWPs. For example, from the perspective of the base station, a carrier with an 80 MHz bandwidth exists, which may be divided into 4 non-overlapping subbands, 20 MHz for each subband. For the UE, one subband is one BWP. One or more BWPs occupied by each downlink transmission of the base station may be different. For example, the UEs served by different downlink transmissions may be different; therefore, the BWPs may be different. Or different downlink transmissions serve the same UE; however, the BWP of this UE is variable.

Based on the new system characteristics, simple reuse of the existing CWS adjustment mode cannot accurately reflect the impact of the last transmitted HARQ-ACK result on the CCA for the current transmission.

In the prior art, the PDSCH HARQ-ACK feedbacks of the unlicensed frequency bands are all transmitted on carriers of the licensed frequency bands, which may guarantee that the base station may timely receive the HARQ-ACK feedbacks at the expected time. However, considering that in the new scenario, a carrier of an unlicensed frequency band may be networked independently or networked with a licensed carrier via dual connectivity, or it might be expected that the unlicensed carrier offloads the uplink control channel of the licensed carrier, it likely occurs that the PDSCH HARQ-ACK is transmitted on the unlicensed carrier. Because signals are transmitted on the unlicensed frequency band, it might be needed to perform LBT; consequently, the HARQ-ACK feedback cannot be guaranteed at the time expected by the base station. Therefore, a new HARQ-ACK feedback mechanism is desired to support a timely and valid HARQ-ACK feedback so as to improve system efficiency.

Besides, the prior art supports that the base station performs the first type of LBT before downlink transmission such that the MCOT may be shared to the UE after the channel is successfully obtained, which means a UE may perform the second type of LBT within this MCOT so as to improve the opportunity for the UE to transmit uplink. Likewise, the UE performs the first type of LBT before uplink transmission; after the channel is successfully obtained, one subframe within the MCOT may be shared to the base station, such that the base station may perform the second type of LBT in this subframe to transmit downlink control information (e.g., an UL grant or a DCI including the HARQ-ACK information) to the UE, so as to improve the uplink transmission efficiency of the UE. However, in the new system, the resources occupied by the base station and the UE for performing LBT and transmission may be different, such that the existing MCOT sharing mechanism might increase the odds of collision between the UE or base station and other nodes, a consequence of which is that the fairness of channel access cannot be guaranteed. Therefore, an innovative method is desired to implement effective sharing of MCOT.

In view of the above, it is necessary to provide a method for uplink/downlink signal transmission and reception and an apparatus therefor so as to solve or mitigate at least part of the technical problems above.

Solution to Problem

According to a first aspect of the present disclosure, a method for data transmission is provided, comprising: performing data transmission in a listen-before-talk mode; obtaining HARQ-ACK information of transmitted data bursts; and adjusting a contention window size CWS for carrier sensing to be performed before transmission of a next data burst based on HARQ-ACK information of reference data, wherein the reference data refers to a chosen PDSCH or PUSCH in a reference slot in a reference data burst selected from the transmitted data bursts.

According to another aspect of the present disclosure, a communicating node device is provided, comprising: a memory unit configured for storing machine-readable instructions that, when being executed by the processing unit, configures the processing unit to execute the method for data transmission according to the present disclosure.

According to a further aspect of the present disclosure, a machine-readable storage medium is provided, wherein machine-readable instructions are stored on the machine-readable storage medium, the machine-readable instructions, when being executed by the processing unit, configuring the processing unit to execute the method for data transmission according to the present disclosure.

Advantageous Effects of Invention

The present disclosure discloses a method for data transmission and a corresponding node device. In a solution of the present disclosure, a transmitting node A at one communicating end obtains HARQ-ACK information according to a predefined manner, and adjusts a contention window size of carrier sensing based on the HARQ-ACK information. The transmitting node A further determines a frequency domain resource over which data bursts are transmitted, based on the frequency domain resource over which the carrier sensing is performed and a result of the carrier sensing. A transmitting node B at the other communicating end determines its own carrier sensing behavior based on the frequency domain resource over which the transmitting node A performs carrier sensing and/or the frequency domain resource over which the data bursts are actually transmitted. The present disclosure may improve HARQ-ACK feedback efficiency and lower the transmission collision between different nodes more effectively.

BRIEF DESCRIPTION OF DRAWINGS

These and/or other aspects and advantages of the present disclosure will become more apparent and comprehensible through the description below in conjunction with the accompanying drawings, wherein:

FIG. 7 schematically illustrates another example of resource occupancy for data transmission according to embodiments of the present disclosure;

FIG. 15 schematically illustrates another example of resource occupancy for data transmission according to embodiments of the present disclosure;

FIG. 16 schematically illustrates another example of resource occupancy for data transmission according to embodiments of the present disclosure;

In the drawings, like or similar reference numerals represent same or similar components.

MODE FOR THE INVENTION

The description below with reference to the accompanying drawings is provided to facilitate comprehensive understanding of the embodiments of the present disclosure limited by the claims and their equivalents. Various specific details are included to facilitate the understanding; however, these details all be construed as only exemplary. Therefore, those of normal skill in the art will be aware that the embodiments described herein may be subjected to various alternations and modifications without departing from the scope and spirit of the present disclosure. Besides, for the sake of clarity and brevity, depictions of known functionalities and structures will be omitted.

Hereinafter, a solution of the present disclosure will be described in detail with reference to the accompanying drawings.

Figure 1:
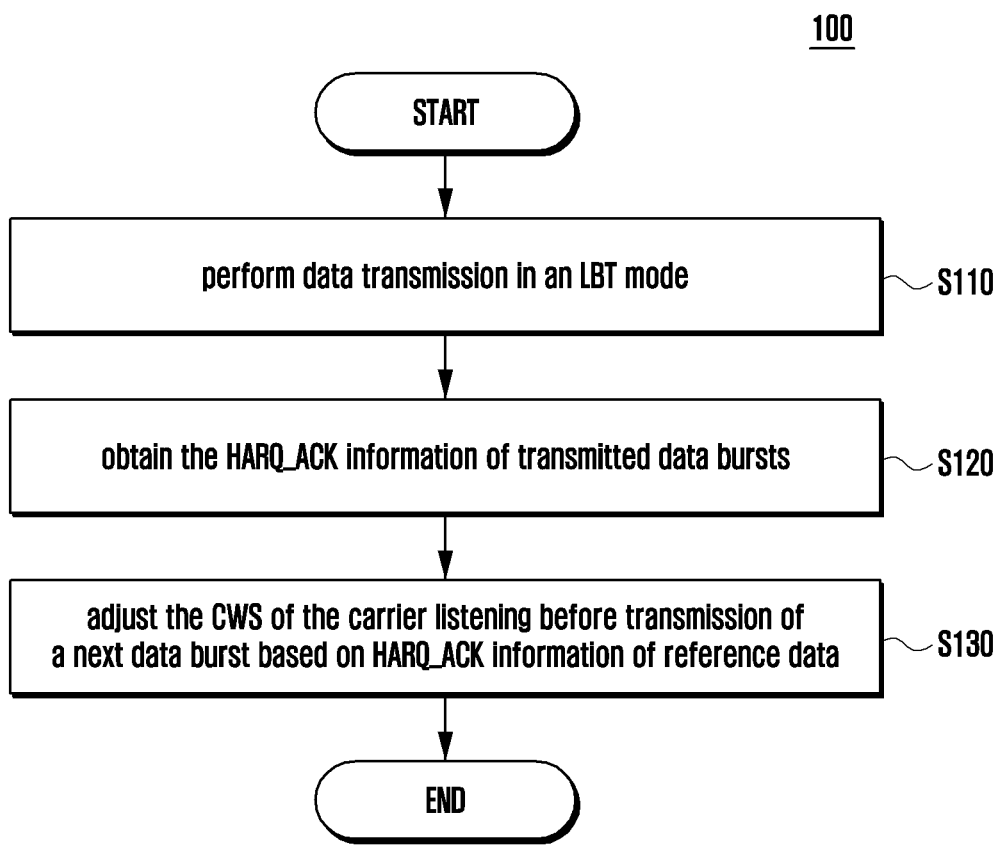
FIG. 1 schematically illustrates a flow diagram of operations, at one node device, of a method for data transmission according to an embodiment of the present disclosure.

FIG. 1 schematically illustrates a flow diagram of a method for data transmission according to an embodiment of the present disclosure. The method 100 may be performed by one communicating party. For example, the method 100 may be performed by a base station. The method 100 may also be performed by a UE.

As shown in the figure, in step S110, data transmission is performed in a listen-before-talk mode.

In step S120, HARQ-ACK information of transmitted data bursts is obtained.

In step S130, a contention window size (CWS) for carrier sensing to be performed before transmission of a next data burst is adjusted based on HARQ-ACK information of reference data, wherein the reference data refers to a chosen PDSCH or PUSCH in a reference slot in a reference data burst selected from the transmitted data bursts.

In the present disclosure, in light of the new characteristics of 5G and future systems, novel solutions are proposed for carrier sensing, actual signal transmission, and HARQ-ACK feedback in a listen-before-talk data transmission mode.

In some embodiments, the reference data burst is selected from the transmitted data bursts based on a relation between a frequency domain resource over which the carrier sensing for the next data burst is to perform and frequency domain resources over which the carrier sensing for previous data bursts were performed. The frequency domain resource may be a BWP or a subband, or a union of a plurality of BWPs or subbands. Alternatively, in some other embodiments, the reference data burst is selected from the transmitted data bursts based on a relation between a frequency domain resource occupied by the transmission of the next data burst and frequency domain resources occupied by the transmission of previous data bursts. Such a frequency domain resource may be a BWP or a subband, or a union of a plurality of BWPs or subbands.

Optionally, the transmitted data burst eligible as the reference data burst should satisfy the following condition: the frequency domain resource over which the carrier sensing for the transmitted data burst was performed is identical to the frequency domain resource over which the carrier sensing for the next data burst is to perform.

Optionally, the transmitted data burst eligible as the reference data burst should satisfy the following condition: the frequency domain resource occupied by the transmission of the transmitted data burst is identical to the frequency domain resource occupied by the transmission of the next data burst.

Optionally, the transmitted data burst eligible as the reference data burst should satisfy the following condition: the frequency domain resource over which the carrier sensing for the transmitted data burst is performed includes the frequency domain resource over which the carrier sensing for the next data burst is performed.

Optionally, the transmitted data burst eligible as the reference data burst should satisfy the following condition: the frequency domain resource occupied by the transmission of the transmitted data burst is located includes the frequency domain resource occupied by the transmission of the next data burst.

Optionally, the transmitted data burst eligible as the reference data burst should satisfy the following condition: the frequency domain resource over which the carrier sensing for the transmitted data burst is performed is included in the frequency domain resource over which the carrier sensing for the next data burst is performed.

Optionally, the transmitted data burst eligible as the reference data burst should satisfy the following condition: the frequency domain resource occupied by the transmission of the transmitted data burst is included in the frequency domain resource occupied by the transmission of the next data burst.

Optionally, the transmitted data burst eligible as the reference data burst should satisfy the following condition: the frequency domain resource over which the carrier sensing for the transmitted data burst is performed overlaps with the frequency domain resource over which the carrier sensing for the next data burst is performed.

Optionally, the transmitted data burst eligible as the reference data burst should satisfy the following condition: the frequency domain resource occupied by the transmission of the transmitted data burst overlaps with the frequency domain resource occupied by the transmission of the next data burst.

In some embodiments, the reference slot refers to a first slot of the reference data burst. Alternatively, in some other embodiments, the reference slot refers to a first slot and a second slot of the reference data burst.

In some embodiments, selecting the reference data comprises: for downlink data transmission, if the control channel scheduling the downlink data transmission and the corresponding downlink data transmission are on different BWPs, not using the transmitted downlink data without a HARQ-ACK feedback being received as reference data.

In some embodiments, selecting the reference data comprises: selecting a PDSCH or PUSCH as the reference data based on the location of the PDSCH or PUSCH in the reference slot.

Optionally, selecting a PDSCH or PUSCH as the reference data based on the location of the PDSCH or PUSCH in the reference slot may comprise: taking all valid PDSCHs or PUSCHs in the reference slot as the reference data.

Optionally, selecting a PDSCH or PUSCH as the reference data based on the location of the PDSCH or PUSCH in the reference slot may include: taking the PDSCH or PUSCH with the earliest occurrence in the time domain in the reference slot as the reference data.

The taking the PDSCH or PUSCH with the earliest occurrence in the time domain in the reference slot as the reference data may comprise: if the reference slot is the first slot, taking the PDSCH or PUSCH with the earliest start point as the reference data.

In some embodiments, selecting the reference data comprises: selecting the PDSCH or PUSCH as the reference data based on expected time of HARQ-ACK reception.

Optionally, selecting the PDSCH or PUSCH as the reference data based on expected time of HARQ-ACK reception comprises: taking the PDSCH or PUSCH with the expected HARQ-ACK reception being earlier than the next data burst transmission as the reference data, and not taking the PDSCH or PUSCH with the expected HARQ-ACK reception being not earlier than the next data burst transmission as the reference data.

Optionally, for the PDSCH or PUSCH with the expected HARQ-ACK reception being earlier than the next data burst transmission, if the HARQ-ACK of the PDSCH or PUSCH is not received, the value of the HARQ-ACK of the PDSCH or PUSCH is assumed as NACK.

In some embodiment, PDSCH or PUSCH scheduling and HARQ-ACK feedback is performed with a granularity of a code block group (CBG); and adjusting the contention window size CWS for carrier sensing to be performed before transmission of the next data burst based on HARQ-ACK information of reference data, comprises: if part of the bits in a CBG are not transmitted or none of the bits in the CBG is transmitted, not using the HARQ-ACK of the CBG for CWS adjustment.

In some embodiments, PUSCH scheduling and HARQ-ACK feedback is performed with a granularity of a code block group (CBG); the UE fails to receive an explicit HARQ-ACK of the PUSCH in the a reference slot from the base station, but only receives an UL grant for part of CBGs of the PUSCH in the reference slot, and adjusting the contention window size CWS for carrier sensing to be performed before transmission of the next data burst based on HARQ-ACK information of reference data, comprises: for a CBG transmitted in the reference slot, if the received UL grant does not include information indicating retransmission or new transmission of the CBG, not using, by the UE, the HARQ-ACK of the CBG for CWS adjustment.

In some other embodiments, PUSCH scheduling and HARQ-ACK feedback is performed with a granularity of a code block group (CBG); the UE fails to receive an explicit HARQ-ACK of the PUSCH in the a reference slot from the base station, but only receives an UL grant for part of CBGs of the PUSCH in the reference slot, and adjusting the contention window size CWS for carrier sensing to be performed before transmission of the next data burst based on HARQ-ACK information of reference data, comprises: for a CBG transmitted in the reference slot, if the received UL grant does not include information indicating retransmission or new transmission of the CBG, assuming, by the UE, the HARQ-ACK of the CBG as ACK for CWS adjustment.

In some further embodiments, PUSCH scheduling and HARQ-ACK feedback is performed with a granularity of a code block group (CBG); the UE fails to receive an explicit HARQ-ACK of the PUSCH in the a reference slot from the base station, but only receives an UL grant for part of CBGs of the PUSCH in the reference slot, and adjusting the contention window size CWS for carrier sensing to be performed before transmission of the next data burst based on HARQ-ACK information of reference data, comprises: for a CBG transmitted in the reference slot, if the received UL grant does not include information indicating retransmission or new transmission of the CBG, assuming, by the UE, HARQ-ACKs of all CBGs corresponding to the PUSCH as ACKs for CWS adjustment.

In still some embodiments, PUSCH scheduling and HARQ-ACK feedback is performed with a granularity of a code block group (CBG); the UE fails to receive an explicit HARQ-ACK of the PUSCH in the a reference slot from the base station, but only receives an UL grant for part of CBGs of the PUSCH in the reference slot, and adjusting the contention window size CWS for carrier sensing to be performed before transmission of the next data burst based on HARQ-ACK information of reference data, comprises: for a CBG transmitted in the reference slot, if the subsequently received UL grant does not include information indicating retransmission or new transmission of the CBG, adjusting, by the UE, the CWS based on the HARQ-ACK of total number of CBGs successfully transmitted in the last data burst as indicated in the UL grant.

In some embodiments, adjusting the contention window size CWS for carrier sensing to be performed before transmission of the next data burst based on HARQ-ACK information of reference data, comprises: in the case that a UE is configured for CBG-based transmission, using the HARQ-ACK of the UE for adjusting the CWS, as long as in the reference slot, the UE has at least one CBG completely transmitted or has at least one CBG with a percentage of an actually transmitted portion thereof to the complete CBG exceeding a predefined threshold.

In some embodiments, adjusting the contention window size CWS for carrier sensing to be performed before transmission of the next data burst based on HARQ-ACK information of reference data, comprises: in the case that a UE is configured for TB (transport block)-based transmission, using the HARQ-ACK of the UE for adjusting the CWS, as long as the UE has one TB completely transmitted or has one TB with a percentage of a successfully transmitted portion thereof to the complete TB exceeding a predefined threshold.

In some embodiments, the data transmission in the listen-before-talk mode is performed in the following way: all downlink transmissions within a same maximum channel occupancy time MCOT are performed on a same BWP or subband, and the carrier sensing before start of the MCOT is performed on the same BWP or subband.

In some embodiments, the data transmission in the listen-before-talk mode is performed in the following way: downlink transmissions within a same MCOT belong to different BWPs or subbands, and the carrier sensing before start of the MCOT is performed on a union of the different BWPs or subbands. Preferably, a second type of carrier sensing is performed before each transmission on a changed BWP or subband within the MCOT. Preferably, performing the carrier sensing before start of the MCOT on a union of the BWPs or subbands may comprise: separately performing the carrier sensing before start of the MCOT on respective BWPs or subbands.

In some embodiments, the data transmission in the listen-before-talk mode is performed in the following way: downlink transmissions within the same MCOT belong to different BWPs or subbands, and the carrier sensing before start of the MCOT is performed on a bandwidth including all of the different BWPs or subbands. Preferably, a second type of carrier sensing is performed before each transmission on a changed BWP or subband within the MCOT.

In some embodiments, performing data transmission in the listen-before-talk mode comprises: in the case that the base station shares its own MCOT with the UE, if the BWPs or subbands on which the UE performs the uplink transmission is a subset of the BWPs or subbands on which the base station performs downlink transmission, then the UE performing the second type of carrier sensing or no carrier sensing before the uplink transmission; otherwise, the UE performing a first type of carrier sensing before the uplink transmission.

In some embodiments, performing data transmission in the listen-before-talk mode comprises: in the case that the base station shares its own MCOT with the UE, if the BWPs or subbands on which the UE performs the uplink transmission is a subset of the BWPs or subbands on which the base station performs the first type of carrier sensing before start of the MCOT, the UE performing the second type of carrier sensing or no carrier sensing before the uplink transmission; otherwise, the UE performing the first type of carrier sensing before the uplink transmission.

In some embodiments, performing data transmission in the listen-before-talk mode comprises: in the case that the UE shares its own MCOT to the base station via uplink control information, transmitting, by the base station, downlink control signaling in a slot indicated by the uplink control information, wherein the DL BWP on which the base station transmits the downlink control signaling is identical to the UL BWP on which the UE transmits the uplink control information, or a frequency domain resource of the DL BWP on which the base station transmits the downlink control signaling is a subset of the frequency domain resource of the UL BWP on which the corresponding UE transmits the uplink control information.

In some embodiments, the HARQ-ACK information is scheduled to be transmitted in the MCOT.

In some embodiments, scheduling the HARQ-ACK information comprises: indicating, through the downlink control information, a set of uplink slots available for the second type of LBT within the MCOT and a time offset relative to a start point of the set of uplink slots available for the second type of LBT.

In some embodiments, the UE is configured with a first uplink resource for feeding back the HARQ-ACK and a second uplink resource for the UE to autonomously attempt to transmit the HARQ-ACK, and transmission of the HARQ-ACK information comprises: attempting, by the UE, to transmit the HARQ-ACK on the first uplink resource; and, in the case of failure, starting to attempt to transmit the HARQ-ACK on one second uplink resource configured immediately after the first uplink resource.

Hereinafter, the method for data transmission according to the present disclosure will be described in detail through the preferred embodiments with reference to FIGS. 3-22.

Embodiment 1

Figure 2:
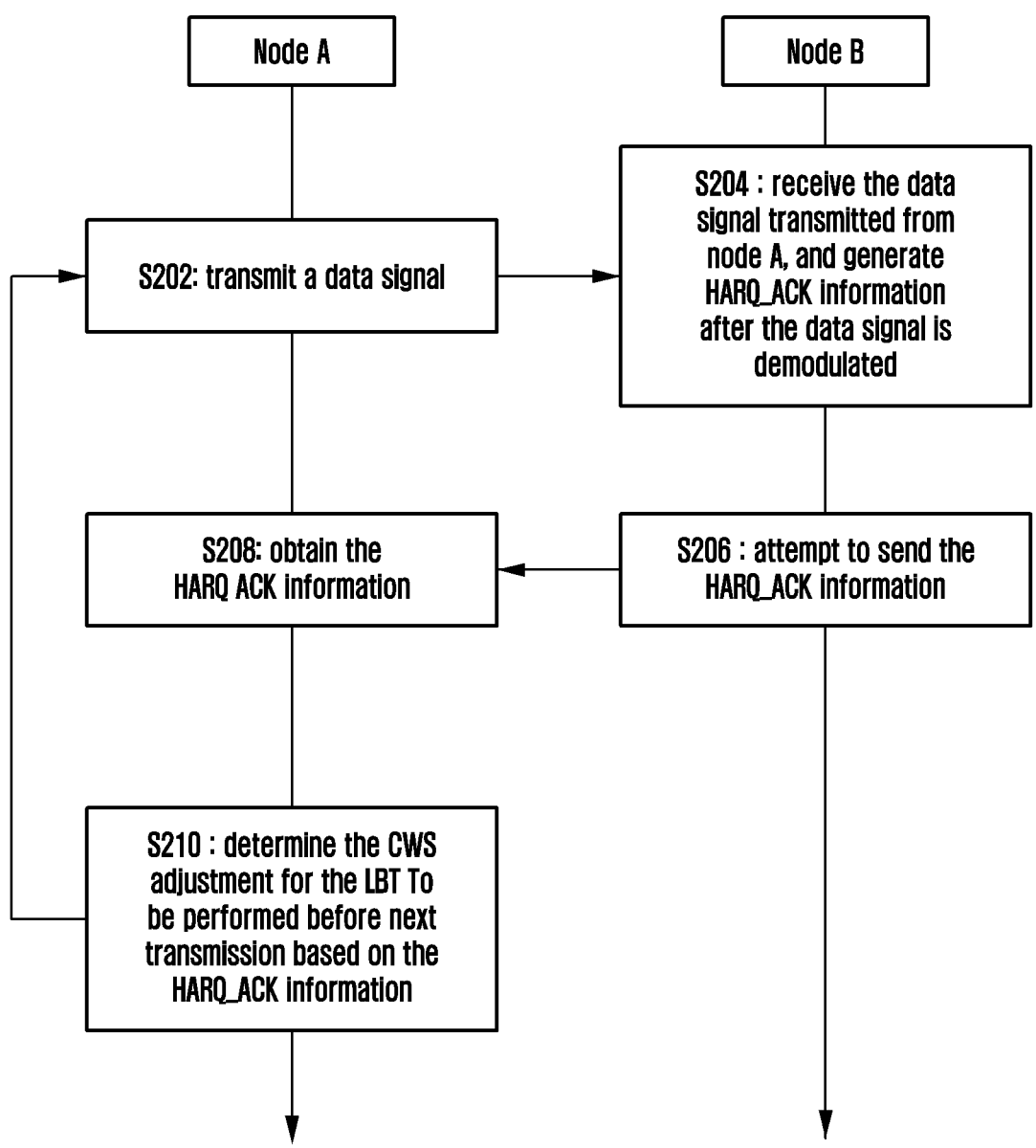
FIG. 2 schematically illustrates a flow diagram of signals flowing between two communicating parties in the method for data transmission according to an embodiment of the present disclosure.

FIG. 2 is a flow diagram of a method 200 according to the present embodiment.

Step S202: transmitting, by a transmitting node A, a data signal.

Step S204: receiving, by a transmitting node B, the data signal from the transmitting node A, and demodulating the data signal to generate HARQ-ACK information.

Step S206: attempting, by the transmitting node B, to transmit the HARQ-ACK information.

Step S208: obtaining, by the transmitting node A, the HARQ-ACK information.

Step S210: determining, by the transmitting node A and based on the HARQ-ACK information, CWS adjustment for the LBT to be performed before next transmission.

In the present disclosure, the transmitting node may be a base station or a user equipment. In the method 200, the transmitting nodes A and B may be a base station (e.g., eNode B) and a user equipment, respectively; or, the transmitting nodes A and B may be a user equipment and a base station, respectively.

The HARQ-ACK information may be explicit HARQ-ACK information or implicit HARQ-ACK information. The explicit HARQ-ACK information refers to HARQ-ACK bit information. The implicit HARQ-ACK information may indicate whether a transmission is a new transmission or a retransmission, or indicate whether the transmission is a retransmission or not. Or, according to a predefined rule, an un-received HARQ-ACK may be taken as the HARQ-ACK information with a predefined value.

In this embodiment, the step 210 is mainly described.

The contents identical to the prior art will not be described in detail here. For example, the reference burst available for CWS adjustment must be the reference burst transmitted after performing the first type of LBT. For another example, the reference burst and the burst of the to-be-adjusted CWS satisfy a predefined timing relationship, for example, a time difference between a reference slot of the reference burst and a start point of the burst of the to-be-adjusted CWS or the start point of the control signal scheduling the burst of the to-be-adjusted CWS is no less than a predefined time difference. For another example, the reference burst is one that at least includes one PDSCH in the first slot, and the base station is expected to have received the HARQ-ACK feedback of this PDSCH before CWS adjustment.

A 5G system introduces a new system design, such that new schemes are also needed regarding how to select a reference HARQ_ID and how to determine CWS adjustment based on the reference HARQ_ID. Hereinafter, schemes for CWS adjustment will be described in detail with respect to various new characteristics in the 5G system.

(1) For a UE or base station, the physical resource over which the LBT is performed before each transmission may be identical or different. Moreover, the bandwidth occupied by each transmission may be identical or different.

In the prior art, the physical blocks (RB) actually occupied each uplink transmission of the UE may be different; but they are all scattered in the system bandwidth in a relatively uniform fashion, and the LBT is performed in the entire system bandwidth. Each downlink transmission of the base station at least includes a reference symbol CRS in the entire system bandwidth, and the LBT is performed in the entire system bandwidth. However, in a new scenario, the frequency domain resource occupied by each downlink transmission of the base station may be different. For example, the UEs served by different downlink transmissions are different, such that the BWPs occupied may be different; or different downlink transmissions serve the same UE, but the BWP occupied by this UE is variable. For another example, the UE might change the BWP for each uplink transmission, i.e., the frequency domain resource occupied might also be different. The resource on which the base station or UE performs LBT before each transmission might also be different. It is easy to envisage that the collisions among transmitting parties on different physical resources might be different. To evaluate the collisions among transmitting parties through the PDSCH of the reference HARQ_ID or the HARQ_ACK of the PUSCH, the reference HARQ_ID may be selected according to at least one of the following manners:

(1.1) the uplink burst and/or downlink burst B which is eligible for the burst where the PDSCH or PUSCH corresponding to the reference HARQ_ID for LBT CWS adjustment of the uplink burst and/or downlink burst A is located should at least satisfy the following condition: the frequency domain resource over which the first type of LBT performed before the transmit burst B is located is identical to the frequency domain resource over which the first type of LBT performed before the transmit burst A is located.

(1.2) the uplink burst and/or downlink burst B which is eligible for the burst where the PDSCH or PUSCH corresponding to the reference HARQ_ID for LBT CWS adjustment of the uplink burst and/or downlink burst A is located should at least satisfy the following condition: the BWP to which the burst transmission B belongs is identical to the BWP to which the burst transmission A belongs; or, the subband to which the burst transmission B belongs is identical to the subband to which the burst transmission A belongs. The BWP may be one BWP (e.g., the transmission or reception can only be performed over one BWP at a time) or may be a plurality of BWPs (e.g., the transmission or reception may be performed over a plurality of BWPs at a time). The present disclosure has no limitation thereto, unless otherwise noted. The definition of subband differs from that of BWP: for uplink or downlink transmission, the maximum bandwidth that may be occupied at a time is denoted as BW1; the BW1 may be divided into M1 number of subbands over which the transmitter may perform the LBT, respectively; and signals are transmitted over one or more subbands where the LBT is successfully performed. Since the BW1 may be one BWP, the subband is a smaller granularity of frequency domain resource in one BWP, also the smallest granularity of the bandwidth occupied for transmitting signals. A special implementation manner is that one subband is one BWP. Then, the transmitter may perform LBT simultaneously over a plurality of BWPs, and signals may be transmitted over one or more BWPs where the LBT has been successfully performed.

If the physical resource used for performing LBT is the BWP for transmitting signals, then (1.1) is identical to (1.2); for example, for each transmission of the UE, the transmission can only be made on one uplink BWP (referred to as active UL BWP); then the LBT is also performed on this BWP. If the physical resource used for performing LBT is not the BWP for transmitting signals (e.g., the bandwidth of the LBT is greater than the bandwidth of the BWP for transmitting uplink signals), then (1.1) is different from (1.2).

Figure 3:
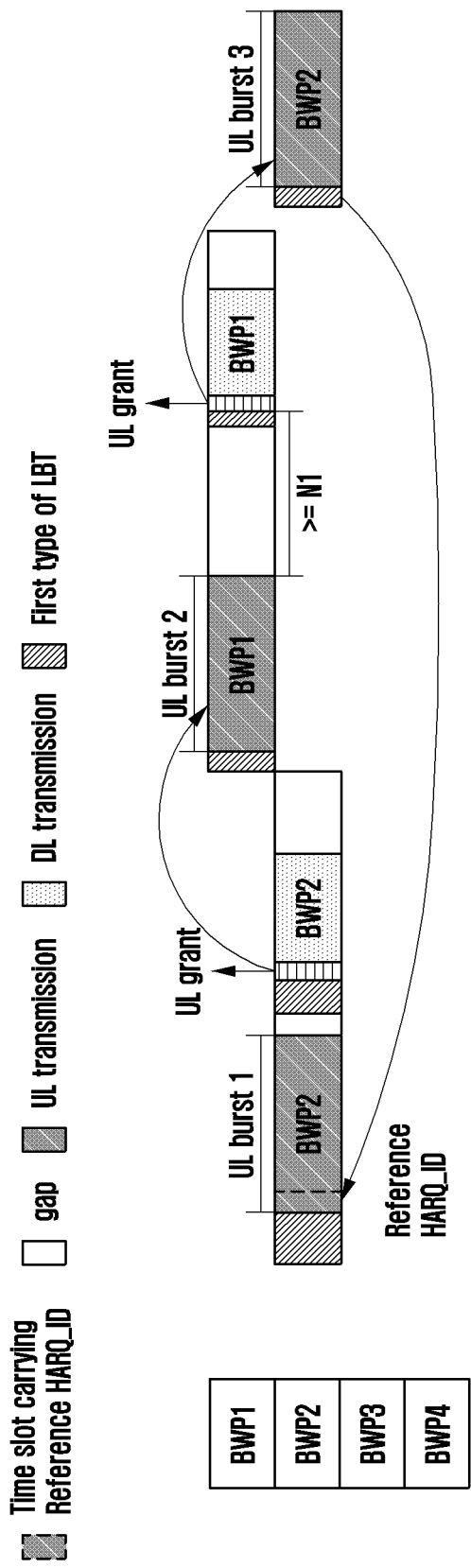
FIG. 3 schematically illustrates an example of resource occupancy for data transmission according to embodiments of the present disclosure.

In the example of FIG. 3, it is assumed that the resource for performing LBT is identical to the BWP for uplink transmission. When the UE selects the CWS for performing the first type of LBT before transmitting an uplink burst 3, an eligible uplink burst immediately preceding the uplink burst 3 will be searched for reference. Such eligible uplink burst should satisfy the following conditions: a) the uplink burst transmitted by the UE after completing the first type of LBT; b) a temporal resource position occupied by which should satisfy a predetermined condition, e.g., the last symbol of the first PUSCH of this uplink burst must be no later than the $N1^{th}$ symbol preceding the start position of the UL grant for scheduling PUSCH transmission in the uplink burst 3, or the slot where the last symbol of the first PUSCH of this uplink burst is located must be no later than the Kith slot preceding the slot where the start position of the UL grant for scheduling the PUSCH transmission in the uplink burst 3 is located; and c) the BWP where such uplink burst is located needs to be completely identical to the BWP where the uplink burst 3 is located. In the figure, although the uplink burst 2 preceding the uplink burst 3 satisfies conditions a) and b), it does not satisfy condition c); therefore, the uplink burst 2 cannot be used as reference. Backward searching is performed to find the uplink burst 1, where the BWP2 occupied by the uplink burst 1 is identical to BWP2 occupied by the uplink burst 3; therefore, the uplink burst 1 is selected as the reference for CWS adjustment of the uplink burst 3. The reference HARQ_ID refers to, for example, all HARQ_IDs of the PUSCH in the first slot of the uplink burst 1. The CWS maintenance at the transmitter and/or receiving party may be maintaining one CWS separately for each BWP. According to another implementation manner, the CWS may be maintained unchanged when the transmitter changes the BWP. For example, although the uplink burst 2 preceding the uplink burst 3 satisfies conditions a) and b), it does not satisfy condition c); therefore, the uplink burst 2 cannot be used as reference. Then, the CWS used for performing the LBT before the uplink burst 3 adopts the CWS for the LBT before the uplink burst 2, i.e., maintained unchanged. In this manner, it is only needed to maintain the same CWS for respective BWPs. According to another implementation manner, when the transmitter changes the BWP, the CWS will adopt a next larger value. For example, although the uplink burst 2 preceding the uplink burst 3 satisfies conditions a) and b), it does not satisfy condition c); therefore, the uplink burst 2 cannot be used as reference. Supposing that the CWS for the LBT before the uplink burst 2 is CWS1, the CWS for the LBT before the uplink burst 2 is 2*CWS1. In this manner, it is also only needed to maintain the same CWS for respective BWPs.

In some communication systems, when the downlink BWP or the uplink BWP for transmitting the HARQ-ACK information changes, the UE does not transmit the HARQ-ACK information at a PDSCH alternative position in the BWP before change. For example, in the TDD system, the UE receives PDSCH 1 and PDSCH 2 on the BWP1, and then the UE transmits the HARQ-ACK information of the PDSCH over the BWP2 through the PUSCCH. The UE does not transmit, over the PUCCH, the HARQ-ACK information of the PDSCH1 and PDSCH2 over the BWP1, or transmits NACK. Then, when the base station performs the LBT over BWP2, the HARQ-ACK information of the PDSCH 1 or PDSCH 2 cannot be used as a reference for CWS adjustment.

(1.3) the uplink burst and/or downlink burst B which is eligible for the burst where the PDSCH or PUSCH corresponding to the reference HARQ_ID for LBT CWS adjustment of the uplink burst and/or downlink burst A is located should at least satisfy the following condition: the frequency domain resource over which the first type of LBT is performed before the transmit burst B includes the frequency domain resource over which the first type of LBT is performed before the transmit burst A.

(1.4) the uplink burst and/or downlink burst B which is eligible for the burst where the PDSCH or PUSCH corresponding to the reference HARQ_ID for LBT CWS adjustment of the uplink burst and/or downlink burst A is located should at least satisfy the following condition: the frequency domain resource for the BWP set where the transmit burst B is located includes the frequency domain resource for the BWP set where the transmit burst A is located; or a subband set to which the burst transmission B belongs includes a subband set to which the burst transmission A belongs. The BWP set may include one or more BWPs; and the subband set may include one more subbands.

Figure 4:
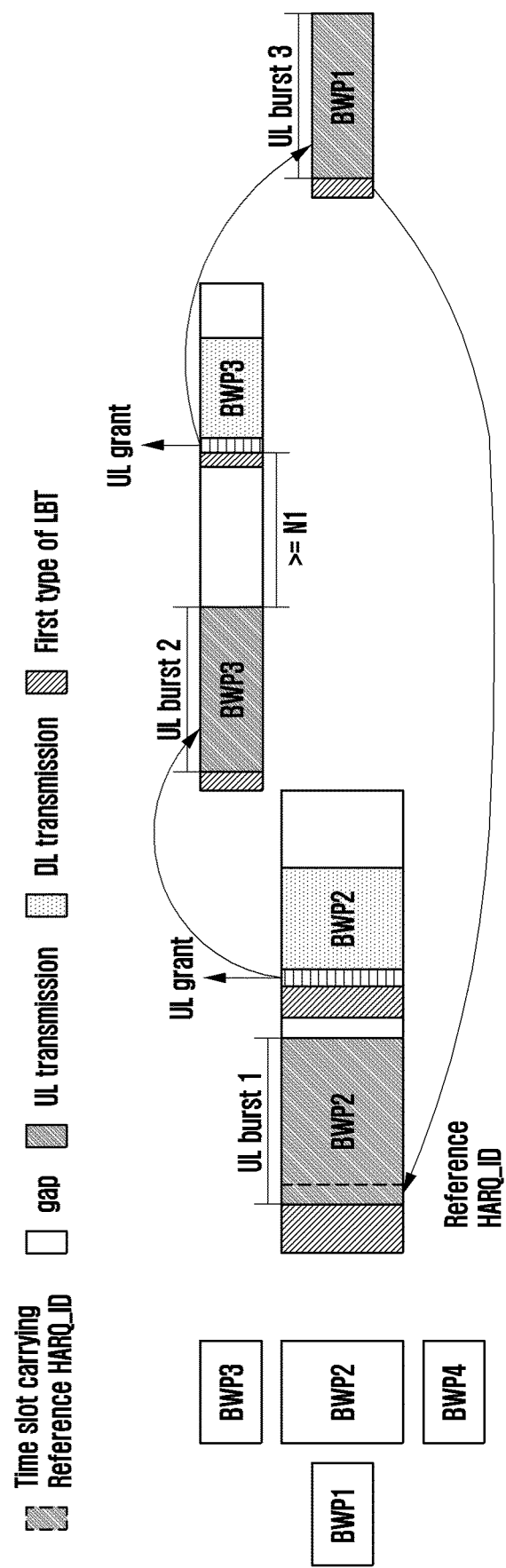
FIG. 4 schematically illustrates another example of resource occupancy for data transmission according to embodiments of the present disclosure.

In the example of FIG. 4, it is assumed that the LBT resource is identical to the BWP for uplink transmission. When the UE selects the CWS for performing the first type of LBT before transmitting the uplink burst 3, an eligible uplink burst immediately preceding the uplink burst 3 will be searched as reference. Such eligible uplink burst should satisfy the following conditions: a) the uplink burst transmitted by the UE after completing the first type of LBT; b) a temporal position occupied by this uplink burst should satisfy a predetermined condition, e.g., the last symbol of the first PUSCH of this uplink burst must be no later than the $N1^{th}$ symbol preceding the start position of the UL grant for scheduling the PUSCH transmission in the uplink burst 3, or the slot where the last symbol of the first PUSCH of this uplink burst is located must be no later than the Kith slot preceding the slot where the start position of the UL grant for scheduling the PUSCH transmission in the uplink burst 3 is located; and c) the frequency domain resource for the BWP set where the uplink burst is located includes the frequency domain resource for the BWP set where the uplink burst 3 is located. In the figure, although the uplink burst 2 preceding the uplink burst 3 satisfies conditions a) and b), it does not satisfy condition c); therefore, the uplink burst 2 cannot be used as reference. Backward searching is performed to find the uplink burst 1 on BWP2, where the frequency domain resource occupied by BWP2 includes the frequency domain resource for the BWP1 occupied by the uplink burst 3; therefore, the uplink burst 1 is selected as the reference for CWS adjustment of the uplink burst 3. The reference HARQ_ID refers to, for example, all HARQ_IDs of the PUSCH in the first slot of the uplink burst 1.

(1.5) the uplink burst and/or downlink burst B which is eligible for the burst where the PDSCH or PUSCH corresponding to the reference HARQ_ID for LBT CWS adjustment of the uplink burst and/or downlink burst A is located should at least satisfy the following condition: the frequency domain resource over which the first type of LBT is performed before the transmit burst B is included in the frequency domain resource over which the frequency domain resource is performed before the transmit burst A.

(1.6) the uplink burst and/or downlink burst B which is eligible for the burst where the PDSCH or PUSCH corresponding to the reference HARQ_ID for LBT CWS adjustment of the uplink burst and/or downlink burst A is located should at least satisfy the following condition: the frequency domain resource for the BWP set where the transmit burst B is located is included in the frequency domain resource for the BWP set where the transmit burst A is located; or a subband set to which the burst transmission B belongs is included in a subband set to which the burst transmission A belongs. The BWP set may include one or more BWPs; and the subband set may include one or more subbands.

Figure 5:
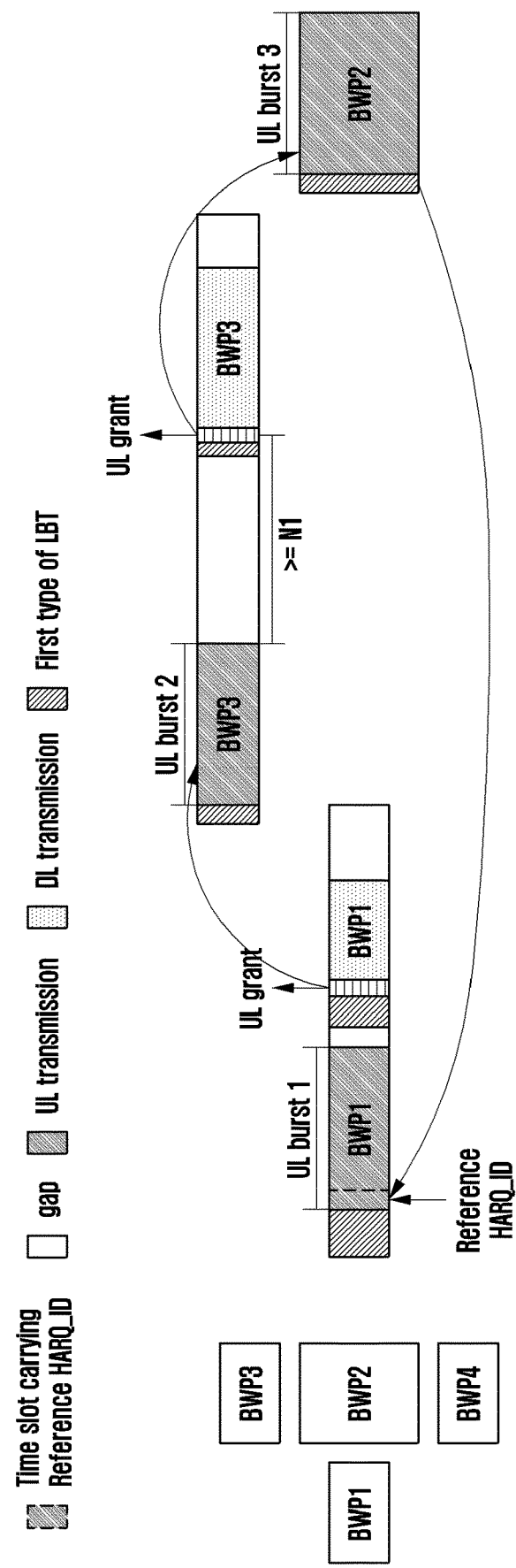
FIG. 5 schematically illustrates another example of resource occupancy for data transmission according to embodiments of the present disclosure.

In the example of FIG. 5, it is assumed that the resource for performing LBT is identical to the BWP for uplink transmission. When the UE selects the CWS for performing the first type of LBT before transmitting the uplink burst 3, an eligible uplink burst immediately preceding the uplink burst 3 will be searched as reference. Such eligible uplink burst should satisfy the following conditions: a) the uplink burst transmitted by the UE after performing the first type of LBT; b) a temporal position occupied by such uplink burst should satisfy a predetermined condition, e.g., the last symbol of the first PUSCH of this uplink burst must be no later than the $N1^{th}$ symbol preceding the start position of the UL grant for scheduling the PUSCH transmission in the uplink burst 3, or the slot where the last symbol of the first PUSCH of this uplink burst is located must be no later than the Kith slot preceding the slot where the start position of the UL grant for scheduling the PUSCH transmission in the uplink burst 3 is located; and c) the frequency domain resource for the BWP set where the uplink burst is located is included in the frequency domain resource for the BWP set where the uplink burst 3 is located. In the figure, although the uplink burst 2 preceding the uplink burst 3 satisfies conditions a) and b), it does not satisfy condition c); therefore, the uplink burst 2 cannot be used as reference. Backward searching is performed to find the uplink burst 1 on BWP1, where the frequency domain resource occupied by BWP1 is included in the frequency domain resource for the BWP2 occupied by the uplink burst 3; therefore, the uplink burst 1 is selected as the reference for CWS adjustment of the uplink burst 3. The reference HARQ_ID refers to, for example, all HARQ_IDs of the PUSCH in the first slot of the uplink burst 1.

(1.7) the uplink burst and/or downlink burst B which is eligible for the burst where the PDSCH or PUSCH corresponding to the reference HARQ_ID for LBT CWS adjustment of the uplink burst and/or downlink burst A is located should at least satisfy the following condition: the frequency domain resource over which the first type of LBT is performed before the transmit burst B overlaps with the frequency domain resource over which the frequency domain resource is performed before the transmit burst A.

Further, a threshold of an overlap area may be defined. For example, if the overlap portion is greater than or equal to 10 MHz, it may be used as reference; or, if a percentage of the overlap portion to the frequency domain resource over which the LBT of the burst A is located is greater than or equal to a threshold value, it may be used as reference.

(1.8) the uplink burst and/or downlink burst B which is eligible for the burst where the PDSCH or PUSCH corresponding to the reference HARQ_ID for LBT CWS adjustment of the uplink burst and/or downlink burst A is located should at least satisfy the following condition: the frequency domain resource for the BWP set where the transmit burst B is located overlaps with the frequency domain resource for the BWP set where the transmit burst A is located; or a subband set to which the burst transmission B belongs overlaps with a subband set to which the burst transmission A belongs. The BWP set may include one or more BWPs; and the subband set may include one or more subbands.

Further, a threshold of an overlap area may be defined. For example, if the overlap portion is greater than or equal to 10 MHz, it may be used as reference; or, if a percentage of the overlap portion to the frequency domain resource of the BWP of the burst A is greater than or equal to a threshold value, it may be used as reference.

Optionally, another implementation manner may be described below: if the two bursts overlap and the BWP set or subband set includes a plurality of BWPs or subbands, only the PDSCH or PUSCH in the BWP (or subband) satisfying (1.2) in the set is used as reference, or only the PDSCH or PUSCH in the BWP (or subband) satisfying (1.4) in the set is used as reference, or only the PDSCH or PUSCH in the BWP (or subband) satisfying (1.6) in the set is used as reference. For example, there exist 4 BWPs (BWP 1, BWP2, BWP3, BWP4) each having a bandwidth of 20 MHz, without overlapping therebetween. BWPs 1, 3, and 4 are occupied to transmit burst B; BWP1 and BWP2 (if the corresponding LBT is successfully performed) are occupied by the transmit burst A; then, the CWS on the BWP1 may use the PDSCH transmitted by the transmit burst B over BWP1 as the reference.

Figure 6:
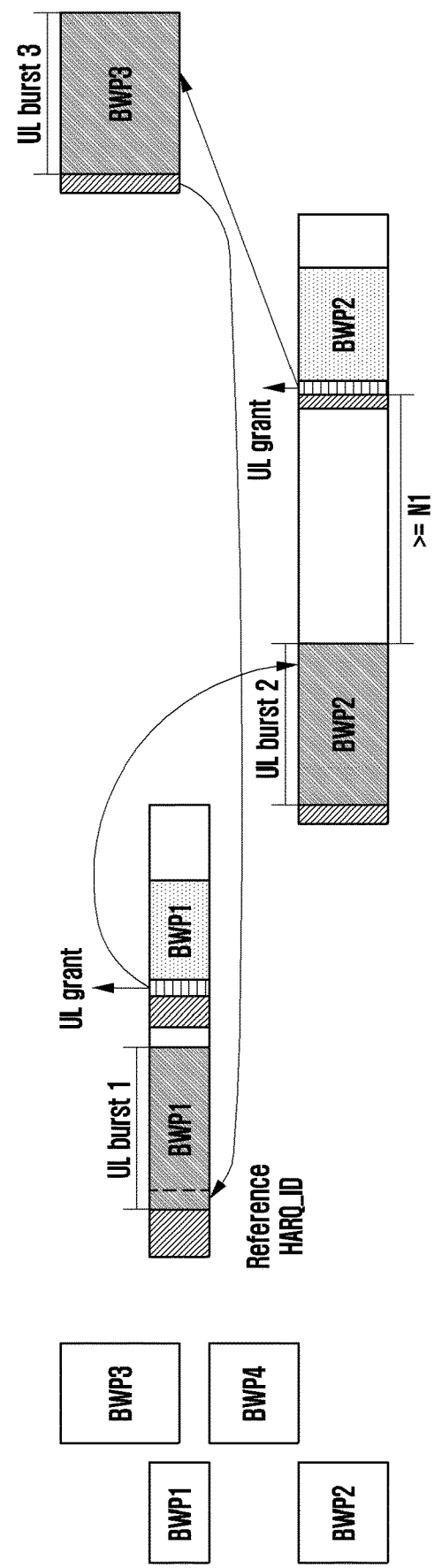
FIG. 6 schematically illustrates another example of resource occupancy for data transmission according to embodiments of the present disclosure.

In the example of FIG. 6, it is assumed that the resource for performing LBT is identical to the BWP for uplink transmission. When the UE selects the CWS for performing the first type of LBT before transmitting the uplink burst 3, an eligible uplink burst immediately preceding the uplink burst 3 will be searched as reference. Such eligible uplink burst should satisfy the following conditions: a) the uplink burst transmitted by the UE after performing the first type of LBT; b) an end position occupied by such uplink burst should satisfy a predetermined condition, e.g., the last symbol of the first PUSCH of this uplink burst must be no later than the $N1^{th}$ symbol preceding the start position of the UL grant for scheduling the PUSCH transmission in the uplink burst 3, or the slot where the last symbol of the first PUSCH of this uplink burst is located must be no later than the Kith slot preceding the slot where the start position of the UL grant for scheduling the PUSCH transmission in the uplink burst 3 is located; and c) the frequency domain resource for the BWP set where the uplink burst is located overlaps with the frequency domain resource for the BWP set where the uplink burst 3 is located. In the figure, although the uplink burst 2 preceding the uplink burst 3 satisfies conditions a) and b), it does not satisfy condition c); therefore, the uplink burst 2 cannot be used as reference. Backward searching is performed to find the uplink burst 1 on BWP1, where the frequency domain resource occupied by BWP1 partially overlaps with the frequency domain resource for the BWP3 occupied by the uplink burst 3; therefore, the uplink burst 1 is selected as the reference for CWS adjustment of the uplink burst 3. The reference HARQ_ID refers to, for example, all HARQ_IDs of the PUSCH in the first slot of the uplink burst 1.

(1.9) in the case that the PDCCH for scheduling PDSCH and the PDSCH are on different BWPs or different subbands, for adjusting the CWS of downlink transmission on the BWP or subband where the PDSCH is located, if the base station fails to receive the HARQ-ACK feedback of the PDSCH, the HARQ_ID of the PDSCH is not used as the reference HARQ_ID, i.e., its HARQ_ACK cannot be used for adjusting the CWS. For example, if the base station transmits PDSCH 1 on the BWP 2 to the UE 1 in the reference slot of the transmit burst A, the PDCCH for scheduling the PDSCH 1 is on the BWP1; if the base station transmits PDSCH 2 on the BWP 2 to UE 2 in the reference slot, the PDCCH scheduling the PDSCH 2 is on the BWP 2. Supposing that the base station transmits the transmit burst B after a certain period of time, during which the base station does not receive the HARQ_ACK feedback of PDSCH 1, the length of this period being no less than the time taken by the UE for generating the HARQ_ACK, but the base station receives the HARQ_ACK (assumed to be ACK) of PDSCH 2 during this period, the number of NACK of CWS adjustment for the transmit burst B is 0, the total number of HARQ_ACK (i.e., the HARQ_ACK from PDSCH 2) is 1, the percentage of NACK is 0, and then the base station resets the CWS.

In a specific implementation, the UE might work on a certain BWP, but the base station may constantly work on a carrier bandwidth. For example, carrier 1 has an 80 MHz bandwidth. Different UEs may be configured with BWPs of 20 MHz, 40 MHz, or 80 MHz; the UEs only attempt to receive on the active BWPs; however, the base station may always perform LBT over the entire 80 MHz bandwidth before transmitting a downlink signal, for example, over 4 subbands of 20 MHz, or over 80 MHz. In this case, a simplified implementation manner may be assumed that the HARQ_ACK referenced by CWS adjustment before each downlink transmission on one carrier may be the HARQ_ACK of the PDSCH at any frequency domain position in this carrier. For example, the base station may count up the HARQ_ACKs of all PDSCHs of the last downlink burst satisfying the time delay requirement. This is similar to downlink CWS adjustment in the existing LAA technologies.

If the UE may perform LBT on a plurality of BWPs simultaneously, the UL CWS of each BWP may be determined separately according to the method described above, and the CWS of each BWP may be further determined based on the UL CWS of each BWP according to the multi-carrier LBT mode in the prior art.

(2) For one UE, one subframe or one slot may include a plurality of PDSCHs or PUSCHs. For example, the base station may assign PDSCHs of different UEs to different symbols in one downlink slot so as to implement multi-user multiplexing in one slot in a TDM manner. For another example, the base station may make the following scheduling: in one downlink or uplink slot, the PDSCHs or PUSCHs of the same UE may be multiplexed in a TDM manner. Then, according to at least one rule in the following manners, one or more PDSCHs/PUSCHs in a reference slot in a transmit burst eligible as reference may be selected as reference HARQ_IDs, and CWS adjustment is determined based on these HARQ_IDs.

Preferably, the reference slot may refer to the first slot and/or the second slot in the transmit burst. For example, if the first slot is an incomplete slot (i.e., the start point of the signal transmitted earliest in the entire slot is later than the start point of the slot), then the reference slot refers to the first slot and the second slot in the reference transmit burst; otherwise, the reference slot is the first slot in the reference transmit burst. For another example, it may be determined whether the reference slot refers to the first slot and/or the second slot according to the methodology in (5) below.

Preferably, if transmission of one PDSCH or PUSCH occupies a plurality of slots, as long as the start point of this PDSCH or PUSCH is located in the reference slot, the PDSCH or PUSCH may be used as the reference PDSCH or PUSCH.

(2.1) All valid PDSCHs/PUSCHs in the reference slot are used as reference, a sum of ACKs in the HARQ_ACKs of these PDSCHs/PUSCHs is counted up, and how to adjust the CWS is determined based on a percentage of the sum of the ACKs to the amount of the HARQ_ACKs (including ACKs and NACKs) of the PDSCHs/PUSCHs.

Preferably, the valid PDSCH/PUSCH may refer to any PDSCH/PUSCH that has obtained or is expected to obtain a HARQ_ACK feedback in the reference slot, or part of the PDSCH/PUSCH in this slot may be determined as valid PDSCH/PUSCH according to the methodologies in (3)/(4)/(5) below.

As shown in FIG. 7, the base station schedules 4 PDSCHs in the downlink reference slot, wherein the PDSCHs 1/2 are frequency-division multiplexed, while PDSCH 1/2 and PDSCH 3, and PDSCH 4 are time-division multiplexed. Suppose that each PDSCH only has one transport block (TB). Then, in this reference slot, the four PDSCHs are all reference PDSCHs, and the HARQ_IDs of these PDSCHs are reference HARQ_IDs. There are four HARQ_ACKs in total. Supposing that the HARQ_ACKs of PDSCHs 1/2/3 thereof are ACKs, and the HARQ_ACK of PDSCH 4 is NACK, then the percentage of ACKs is ¾, greater than a predefined ACK threshold (e.g., Th_ack=20%), such that the CWS may be reset.

(2.2) the PDSCH or PUSCH with an earliest occurrence in the time domain in one reference slot is used as reference.

Preferably, if the reference slot is the first slot, the PDSCH or PUSCH with the earliest start point among the PDSCHs or PUSCHs is taken as the reference.

Figure 8A:
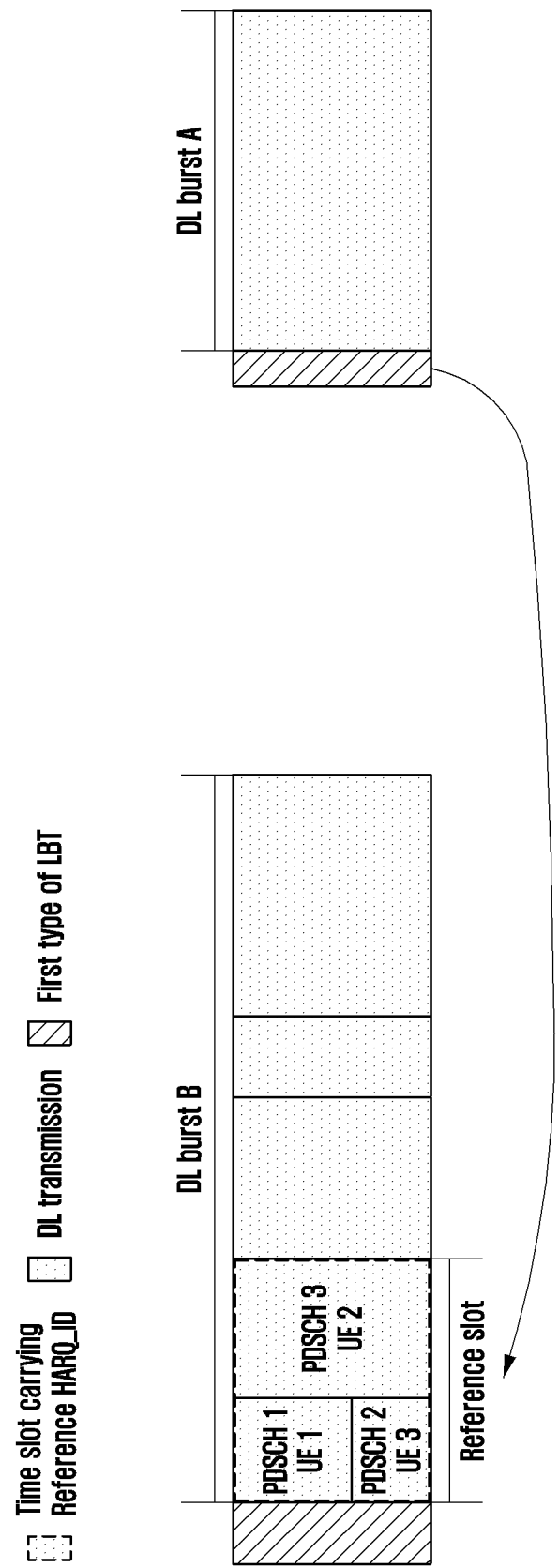
FIG. 8a schematically illustrates another example of resource occupancy for data transmission according to embodiments of the present disclosure.

As shown in FIG. 8a, the base station schedules the PDSCHs of three UEs in the reference slot, i.e., PDSCHs 1, 2, 3, respectively. Among them, the start points of PDSCH 1 and PDSCH 2 are aligned, both of which start from the first symbol of the reference slot, and PDSCH 3 starts from the $8^{th}$ symbol of the reference slot. Then, the HARQ_ACK results of PDSCHs 1/2 may be used as reference for CWS adjustment, and the HARQ_ACK of PDSCH 3 may not be used as reference for CWS adjustment.

Figure 8B:
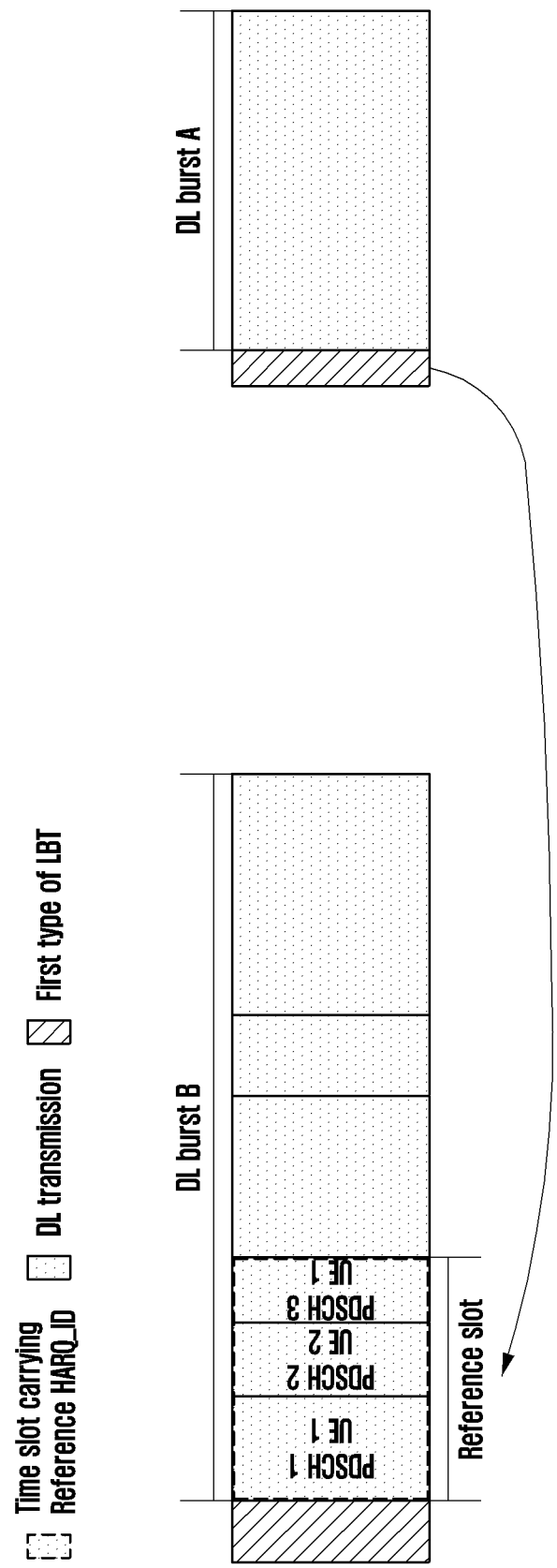
FIG. 8b schematically illustrates another example of resource occupancy for data transmission according to embodiments of the present disclosure.

As further shown in FIG. 8b, the start points of PDSCH 1, PDSCH 2, and PDSCH 3 are different from one another. In the reference slot, the PDSCH with the earliest start pint is selected as reference, i.e., PDSCH 1.

Preferably, if the reference slot is the first slot, for each UE whose PDSCH or PUSCH is scheduled during this slot, the PDSCH or PUSCH with the earliest start point among the PDSCHs or PUSCHs of this UE is used as the reference for this UE, and the CWS adjustment is determined based on joint statistics on the HARQ_ACKs of corresponding PDSCHs or PUSCHs of all UEs. As shown in FIG. 8b, the PDSCHs 1/3 are the PDSCHs of UE1, and the PDSCH 2 is the PDSCH of UE2. Then, for UE1, PDSCH 1 is used as reference; for UE 2, PDSCH 2 is used as reference. Namely, in the reference slot, a percentage of the number of ACKs of PDSCH 1 and PDSCH 2 to the number of HARQ_ACKs of PDSCH 1 and PDSCH 2 is used to determine how to adjust the CWS.

(3) The time for receiving HARQ_ACK of each PDSCH or PUSCH in the same slot might be different; or, due to the impact of LBT, the time for successfully receiving the HARQ_ACKs of these PDSCHs might be different. It may be determined whether the PDSCH or PUSCH in the reference slot may be used as reference according to at least one of the following manners:

(3.1) for the PDSCH in the reference slot, it may be determined, based on HARQ_ACK timing, whether the HARQ_ACK of the PDSCH is expected to be received before the downlink transmit burst A. If the HARQ_ACK of the PDSCH in the reference slot is expected to be received before the downlink transmit burst A, the PDSCH is used as reference; otherwise, it cannot be used as reference. The HARQ_ACK timing may be HARQ_ACK timing information K1 indicated in the PDCCH for scheduling the PDSCH, or HARQ_ACK timing configured for RRC, or defined in the standard, or may be determined based on a minimum processing time of generating the HARQ_ACK information after the UE processes the PDSCH. If the HARQ_ACKs of all PDSCHs in the reference slot in the downlink burst immediately preceding the downlink burst A are expected to be after the downlink burst A, backward searching is continued to find the latest downlink burst, till finding one downlink burst where a reference slot thereof at least includes one PDSCH whose HARQ_ACK is expected to be received before the downlink burst A, and the first slot of the downlink burst is the reference slot, or till finding one downlink burst where a reference slot thereof at least includes X number of PDSCHs whose HARQ_ACKs are expected to be received before the downlink burst A, wherein the first slot of the downlink burst is the reference slot, X being a positive integer that is predefined or BS (base station)-configured.

For example, PDSCHs 1/2/3/4 in FIG. 7 all belong to a same slot; however, the base station may indicate different HARQ_ACK timing for these PDSCHs. The base station may indicate that the HARQ_ACK timing of PDSCHs 1/2 and PDSCH 4 are before start of the downlink transmit burst A, while the HARQ_ACK timing of PDSCH 3 is after start of the downlink transmit burst B. Then, the HARQ_ACK results of PDSCHs 1/2 and PDSCH 4 are used as reference, while the HARQ_ACK result of PDSCH 3 is not used as reference. As supposed above, the HARQ_ACKs of PDSCHs 1/2/3 are ACKs, and the HARQ_ACK of PDSCH 4 is NACK, then the percentage of ACKs is ⅔, and the CWS is reset.

Figure 9:
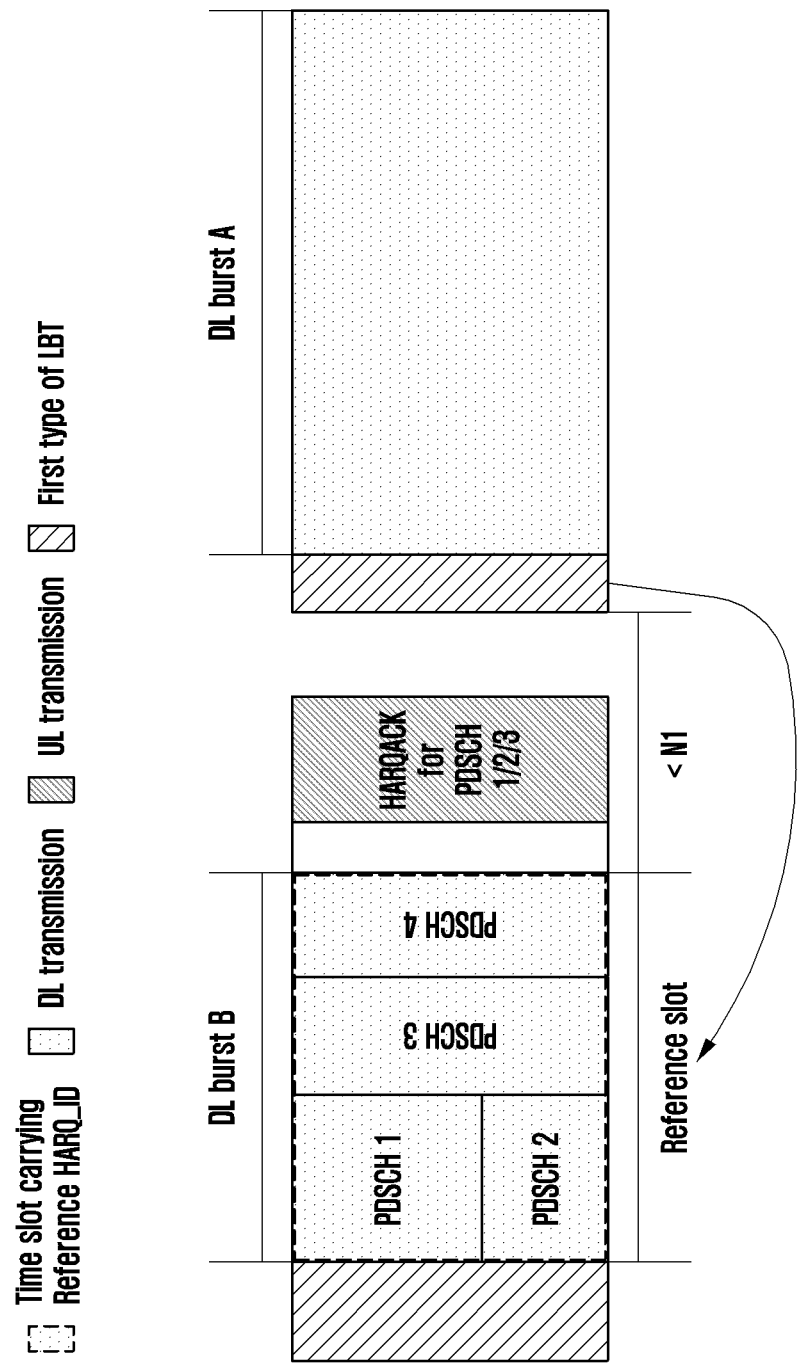
FIG. 9 schematically illustrates another example of resource occupancy for data transmission according to embodiments of the present disclosure.

For another example, suppose that the minimum processing time of generating the HARQ_ACK information after the UE processes the PDSCH is N1. In FIG. 9, the downlink transmit burst B is a reference burst, which only includes 1 slot; besides, the HARQ_ACKs of the PDSCHs 1/2/3 in this slot are successfully transmitted before the downlink transmit burst A; the base station successfully receives the HARQ_ACKs before the downlink transmit burst A; however, the time interval between the downlink transmit burst A and the PDSCH 4 is not enough for the base station to obtain the HARQ_ACK of PDSCH 4, e.g., the time interval <N1. Then, only the HARQ_ACKs of the PDSCHs 1/2/3 are used as references. Accordingly, the percentage of ACKs is 3/3, and the CWS is reset. Generally, for different UEs, different PDSCHs might have different Nis. For example, if the UEs have different processing capabilities, or if although the UEs have same processing capabilities, the PDSCHs received have different mapping types or resource end positions (e.g., mapping type A or type B defined in TS 38.214) or different DMRS resources, the N1s might also be different. In one implementation manner, determination may be made based on the actual N1 of each UE. In some circumstances, although the base station may receive the HARQ_ACK of a PDSCH, the received HARQ_ACK might be meaningless. For example, for a semi-static codebook or a HARQ_ACK codebook based on feedback of all HARQ processes, the HARQ_ACKs included in the codebook might be invalid to corresponding PDSCHs, because the latency between the time point of reporting the HARQ_ACK and the end point of receiving the PDSCH does not satisfy N1, and UE only transmits NACK for occupancy. In this case, the base station cannot use the HARQ_ACK of such PDSCH as reference for CWS adjustment.

In a special implementation manner, a reference downlink burst may be determined based on a minimum value or a maximum value of the N1 of each PDSCH in the reference slot in the downlink burst immediately preceding the downlink burst A. For example, there are downlink bursts C, B, A along the time sequence. Supposing that the base station computes the time point T1 of the ACK/NACK for CWS adjustment of downlink burst A; if the first slot in the downlink burst B has PDSCH 1 and PDSCH 2, the minimum processing time of different frequency domain resources occupying the same time resource is N1_1, N1_2, respectively. Supposing that a time difference between the end position of PDSCH 1/PDSCH 2 and T1 is T_d, and N1_2>T_d>N1_1; if the reference time is determined according to a minimum value, then the downlink burst B is used as the reference burst; if the reference time is determined according to a maximum value, the transmit burst C of an earlier time is used as the reference burst.

(3.2) For a PDSCH in the reference slot, if the base station is expected to receive the HARQ_ACK of the PDSCH before slot m or time m at the latest, and the slot m or time point m is earlier than the start point of the transmit burst A; then, if the base station receives the HARQ_ACK of the PDSCH, then the PDSCH may be used as reference, and the HARQ_ACK value for CWS adjustment is determined based on the received HARQ_ACK feedback; if the base station does not receive the HARQ_ACK of the PDSCH, the PDSCH may be used as reference and the HARQ_ACK value of the PDSCH is supposed to be NACK.

If the base station is expected to receive the HARQ_ACK of the PDSCH before slot m or time point m at the latest, and the slot m or time point m is earlier than the start point of the transmit burst A; if the base station receives the HARQ_ACK of the PDSCH, then the PDSCH may be used as reference, and the HARQ_ACK value for CWS adjustment is determined based on the received HARQ_ACK feedback; if the base station does not receive the HARQ_ACK of the PDSCH, the PDSCH may not be used as reference.

Preferably, the slot m or time point m of the HARQ_ACK expected to be received by the base station at the latest is the first slot m or the most recent time point m experiencing time T1 starting from the end symbol of the PDSCH of the HARQ_ACK or starting from the slot of the PDSCH (the start point or end point of the slot).

Preferably, the slot m or time point m of the HARQ_ACK expected to be received by the base station at the latest is the first slot m or the most recent time point m experiencing time T1 starting from the start point or end point of the PUCCH or PUSCH of the HARQ_ACK expected to be received by the base station for the first time. Within the time window T1, the UE may attempt to at least transmit the HARQ_ACK once based on scheduling of the base station or based on a predefined rule.

Figure 10A:
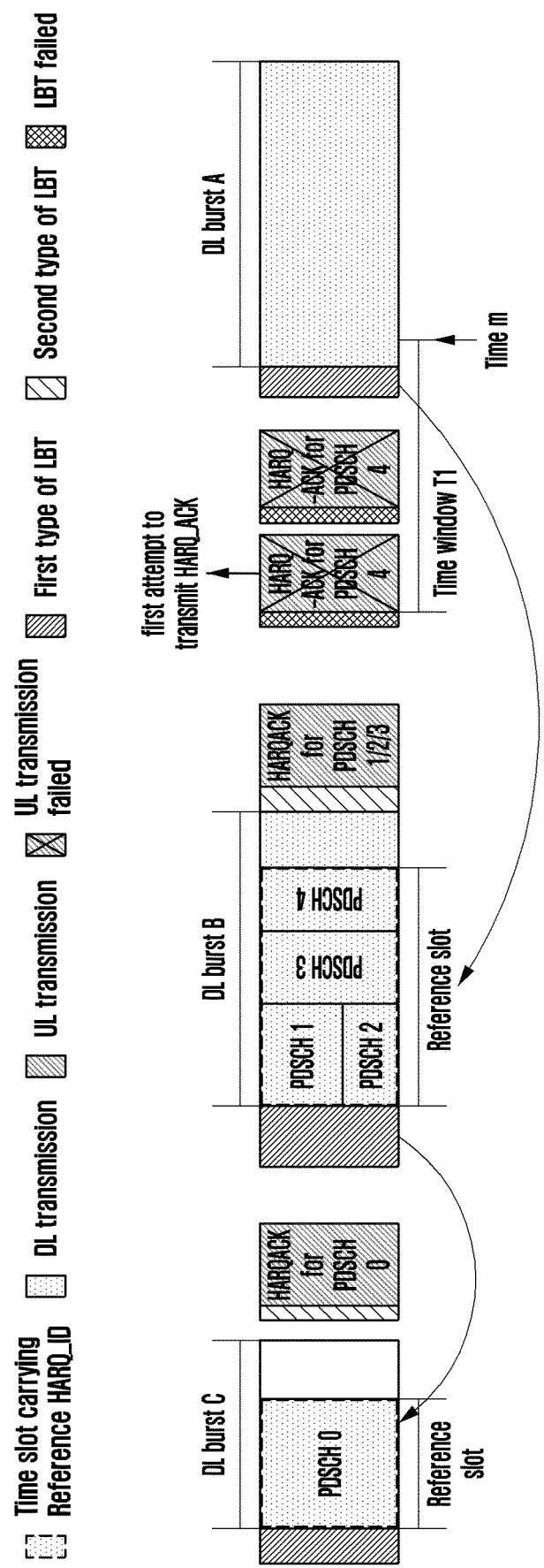
FIG. 10a schematically illustrates another example of resource occupancy for data transmission according to embodiments of the present disclosure.

As shown in FIG. 10a, supposing that the UE successfully transmits the HARQ_ACKs of PDSCHs 1/2/3 before start of the downlink transmit burst A, but fails to transmit the HARQ_ACK of PDSCH 4, and the latest time point m of the HARQ_ACK of the PDSCH 4 expected to be received by the base station is later than a starting point of the downlink transmit burst A, then the PDSCH 4 is not used as the reference PDSCH, and the CWS is only adjusted based on the HARQ_ACKs of PDSCHs 1/2/3.

Figure 11:
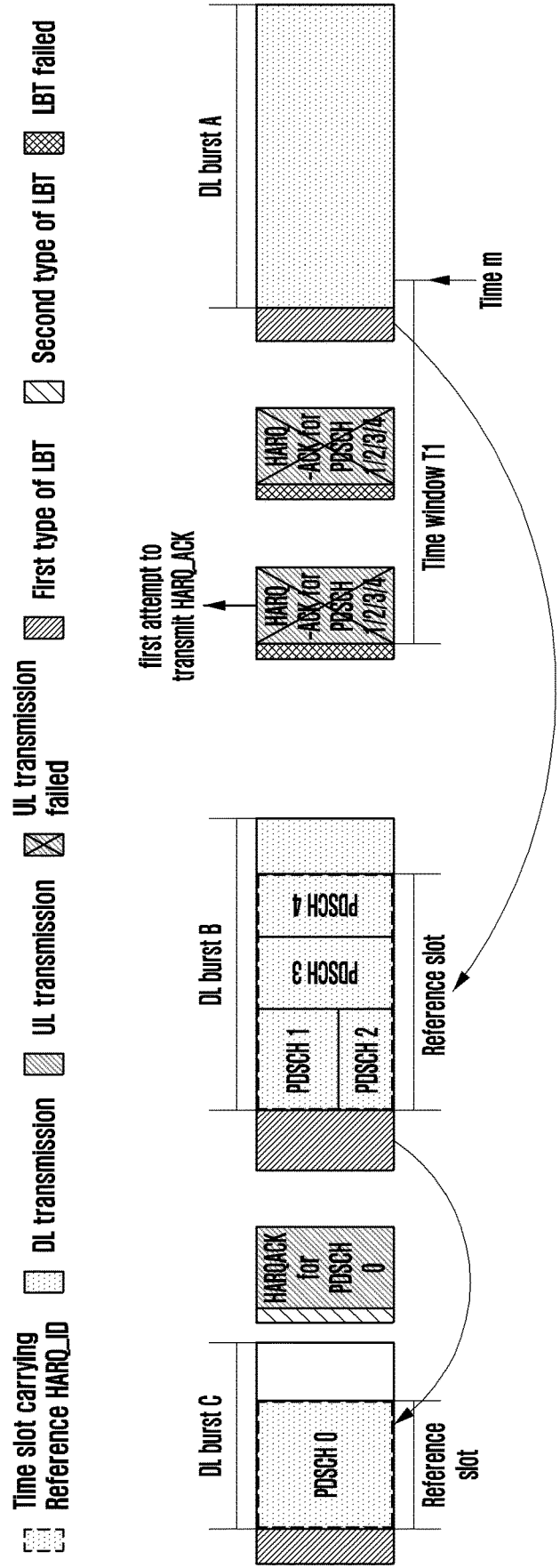
FIG. 11 schematically illustrates another example of resource occupancy for data transmission according to embodiments of the present disclosure.

If the base station is expected to receive the HARQ_ACK of at least one PDSCH in the reference slot before the downlink transmit burst A, but does not receive the HARQ_ACK of any PDSCH in the reference slot before the downlink transmit burst A, and the latest time m for receiving the HARQ_ACK of any PDSCH is no late than the downlink transmit burst A, then the base station does not adjust the CWS. Or, if a further previous HARQ_ACK of the downlink transmit burst eligible as a reference burst has never been used for CWS adjustment, the downlink transmit burst may be used as a reference burst, and the CWS adjustment of the downlink transmit burst A is performed based on the HARQ_ACK of the PDSCH in the reference slot; if the downlink burst has been used for adjustment, the base station does not adjust the CWS of the downlink transmit burst A. As shown in FIG. 11, before the downlink transmit burst A, the UE fails to transmit any HARQ_ACK of PDSCHs 1~4, and the latest time m of the HARQ_ACK reception is no later than the downlink transmit burst A. Because the HARQ_ACK of further previous downlink transmit burst C has been used as the CWS adjustment reference for downlink transmit burst B, it cannot be further used for CWS adjustment reference for the downlink transmit burst A, such that the base station maintains the CWS of the downlink transmit burst A unchanged, i.e., identical to the CWS of the downlink transmit burst B.

Preferably, the T1 is predefined in the standard or configured by the base station. For example, T1 is defined as T1=max (the duration of the downlink burst where the PDSCH is located+1, the CWS adjustment timer X), wherein X is configured by the base station, or T1=0. According to an implementation manner, if T1=0, the slot m or time point m when the base station is expected to receive the HARQ_ACK at the latest is the first slot m or the most recent time m experiencing time T1 starting from the start time or end time when the base station is expected to receive the PUCCH or PUSCH of the HARQ_ACK for the first time, then if the base station does not receive the HARQ_ACK in the PUCCH or PUSCH of the HARQ_ACK expected to be received by the base station for the first time, and then the base station believes that the HARQ_ACK is NACK.

(3.3) If the LBT is being performed but has not been completed yet while the base station receives the HARQ_ACK of the PDSCH in the reference slot, then the base station may re-determine the CWS based on the received HARQ_ACK, and the LBT is then performed based on the new CWS.

Figure 10B:
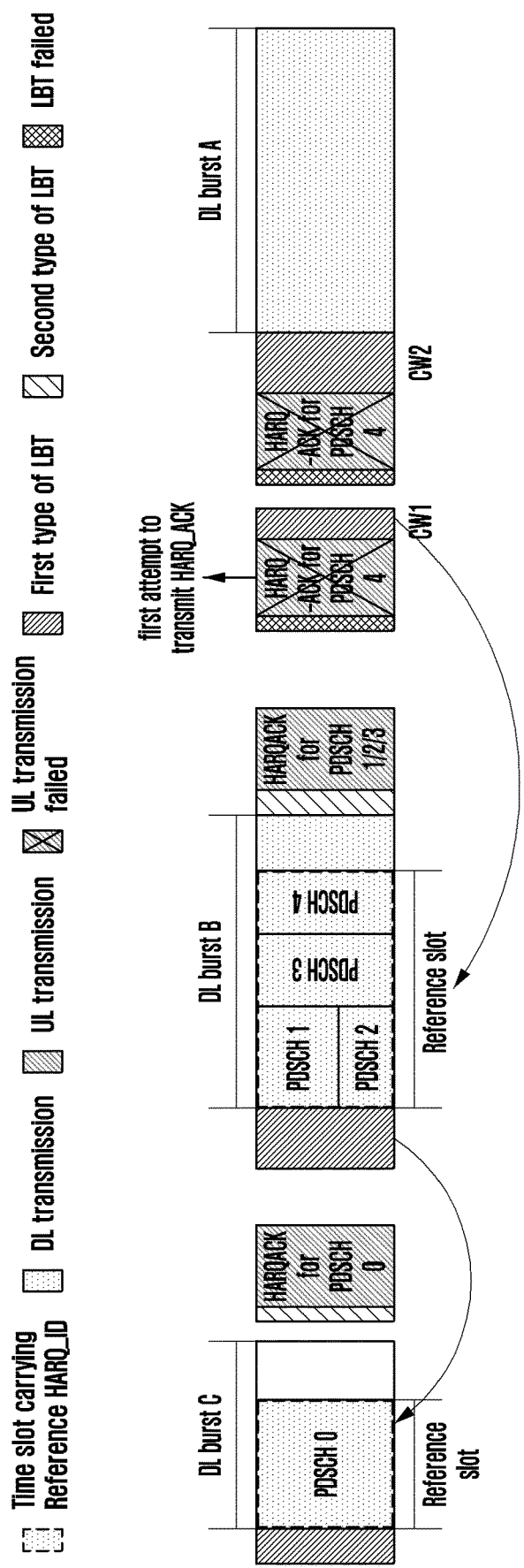
FIG. 10b schematically illustrates another example of resource occupancy for data transmission according to embodiments of the present disclosure.

As shown in FIG. 10b, supposing that the UE successfully transmits the HARQ_ACKs of PDSCHs 1/2/3 before start of the downlink transmit burst A, but fails to transmit the HARQ_ACK at the position where the base station is expected to first receive the HARQ_ACK of the PDSCH 4. The base station determines that the CWS length is CW1 only based on the HARQ_ACKs of PDSCHs 1/2/3, or the base station determines the CWS length to CW1 based on the HARQ_ACKs of PDSCHs 1/2/3 and by processing the HARQ_ACK of the PDSCH 4 to NACK, and the LBT starts being performed based on CW1. If the base station triggers HARQ_ACK retransmission of PDSCH 4 and receives the HARQ_ACK before completion of the LBT, then the base station may re-determine the CWS length to CW2 based on the HARQ_ACKs of the received PDSCHs 1~4 and perform LBT based on CW2.

Figure 10C:
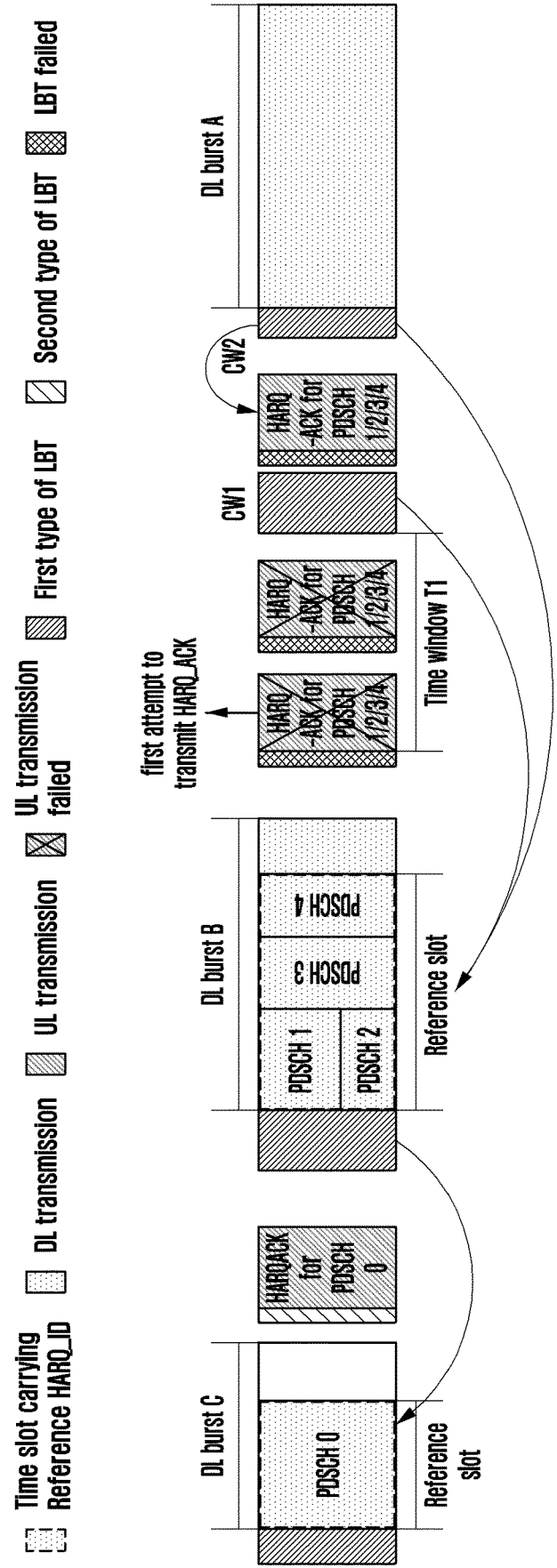
FIG. 10c schematically illustrates another example of resource occupancy for data transmission according to embodiments of the present disclosure.

For another example, ss shown in FIG. 10c, before the downlink transmit burst A, the UE fails to transmit any HARQ_ACK of PDSCHs 1~4, and the latest time m of the HARQ_ACK reception is earlier than the downlink transmit burst A. Then, the base station believes that the HARQ_ACKs of PDSCHs 1~4 are all NACK, the base station increases the CWS length, denoted as CW1, and then LBT starts being performed based on CW1. If the base station triggers retransmission of HARQ_ACKs of PDSCHs 1~4 and receives these HARQ_ACKs before completion of the LBT, then the base station may re-determine the CWS length to CW2 based on the HARQ_ACKs of the received PDSCHs 1~4 and perform LBT based on CW2.

Figure 10D:
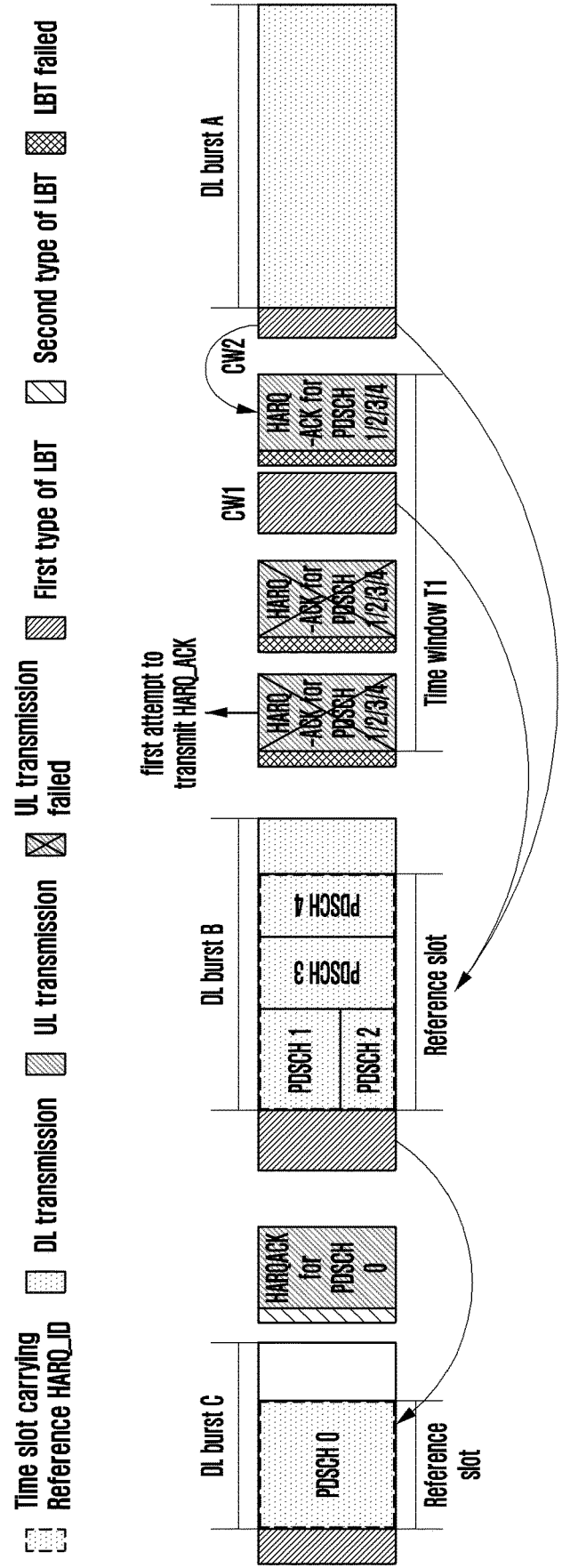
FIG. 10d schematically illustrates another example of resource occupancy for data transmission according to embodiments of the present disclosure.

For another example, as shown in FIG. 10d, before the downlink transmit burst A, the UE fails to transmit any HARQ_ACK of PDSCHs 1~4, and the latest time point of the HARQ_ACK reception is no later than the downlink transmit burst A. Because the HARQ_ACK of further previous downlink transmit burst C has been used as the CWS adjustment reference for downlink transmit burst B, it cannot be further used for CWS adjustment reference for the downlink transmit burst A, such that the base station maintains the CWS of the downlink transmit burst A unchanged, i.e., identical to the CWS of the downlink transmit burst B, denoted as CW1, and the LBT starts being performed based on CW1. If the base station triggers retransmission of HARQ_ACKs of PDSCHs 1~4 and receives these HARQ_ACKs before completion of the LBT, then the base station may re-determine the CWS length to CW2 based on the HARQ_ACKs of the received PDSCHs 1~4 and perform LBT based on CW2.

(4) For a UE or base station, scheduling of PDSCH or PUSCH and the HARQ_ACK may be performed per CBG. More straightforwardly, when counting up the HARQ_ACKs for CWS adjustment, the HARQ_ACKs of all CBGs of reference PDSCHs or PUSCHs are summed. However, considering that the HARQ_ACKs of part of the CBGs cannot reflect the collisions among the transmitting parties, or the HARQ_ACKs of part of CBGs cannot be directly obtained, it is needed to determine the HARQ_ACKs of which CBGs may be counted in, as well as how to utilize the HARQ_ACK information that is not directly obtained. Besides, because some of the HARQ_ACK for CWS adjustment might be with TB granularity and some of the HARQ_ACK is with CBG granularity, it is needed to determine how to count up the HARQ_ACK information with different granularities so as to reflect the collisions among the transmitting parties more accurately. It may be determined the HARQ_ACKs of which CBGs of the reference PDSCH or PUSCH are available for CWS adjustment according to at least one of the following manners:

(4.1) If part of the bit information of a CBG has not been transmitted or none of the bit information in the CBG has been transmitted, the HARQ_ACK of the CBG is not used for CWS adjustment. More preferably, the transmitted may be a circumstance where the bit information has been scheduled by the base station but the base station or the UE does not transmit it, or a circumstance where the UE is expected to transmit but has not transmit yet, or a circumstance where the base station does not schedule, or the UE is not expected to transmit.

Figure 12:
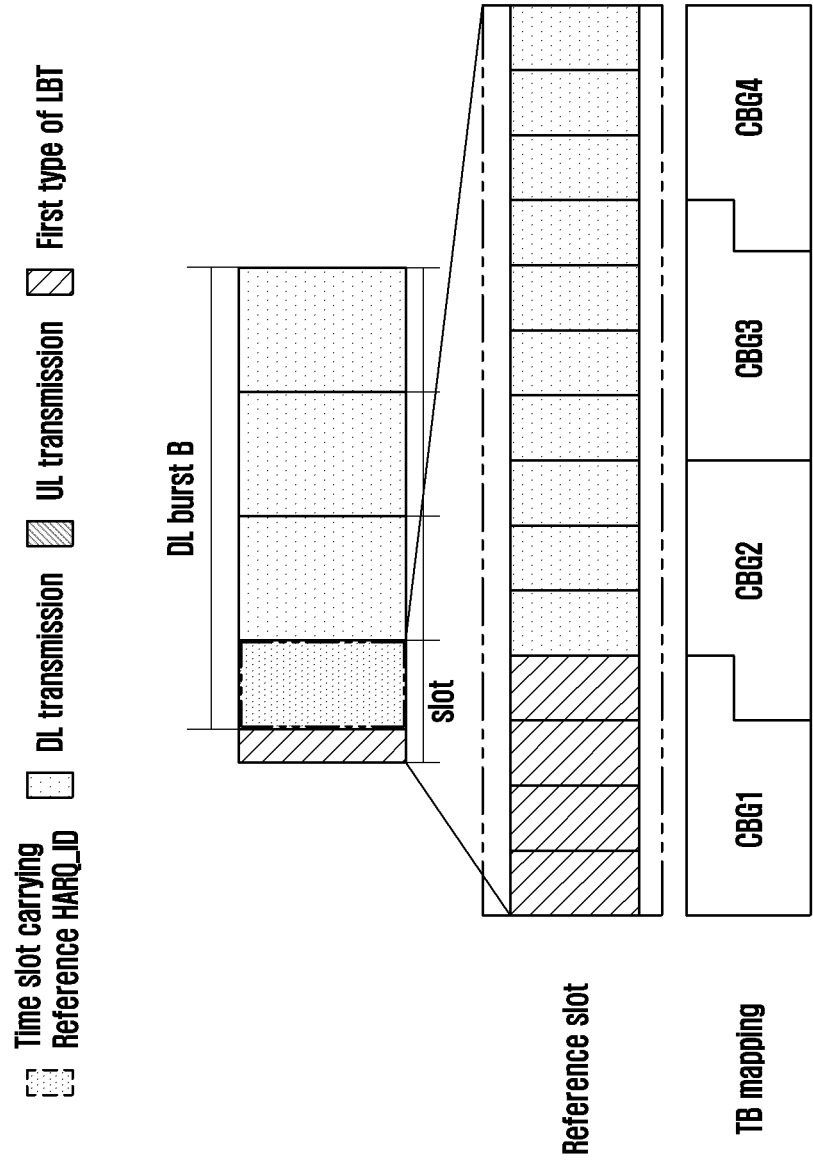
FIG. 12 schematically illustrates another example of resource occupancy for data transmission according to embodiments of the present disclosure.

As shown in FIG. 12, one PDSCH in the reference slot includes one TB, and this TB may be segmented into 4 CBGs. Because the base station only successfully completes LBT at the $4^{th}$ symbol of the reference slot and then starts to transmit the TB, such that the first CBG is not transmitted, and only a portion of the second CBG is transmitted; then the HARQ_ACKs of the first and second HARQ_ACKs are not used for CWS adjustment.

For another example, because one PDSCH or PUSCH transmission may only include part of CBGs of one TB, for example, the base station schedules the UE to send a complete TB over the PUSCH transmission sent by the uplink transmit burst C, the base station correctly decodes CBG1 and CBG4 of this TB, but fails to correctly decode the CBG 2 and CBG 3 of this TB, and successfully feeds back the HARQ_ACKs as A/N/N/A to the UE, e.g., explicitly indicating the HARQ_ACK of a HARQ process specified by the UE or the HARQ_ACKs of all HARQ processes through a DCI for bearing the HARQ_ACK information of the UE, each HARQ process including Nt*Ncbg-bit HARQ_ACKs, wherein Nt denotes the configured number of Tbs that may be borne by one PUSCH, or Nt is fixed to be 1, and Ncbg denotes the configured maximum number of CBGs that may be segmented from one TB. Afterwards, the base station schedules the UE to re-transmit CBG2 and CBG3 in the uplink transmit burst B; the UE calculates that the percentage of ACK is 50% based on the A/N/N/A fed back by the base station, which is greater than the predefined threshold of CWS increase (the threshold is supposed to be 30%); then the CWS is reset. The base station correctly decodes CBG2 but fails to decode CBG3; therefore, the base station feeds back N/A/N/N (CBG feedback NACK not scheduled and ever fed back as A/N. Or the HARQ_ACK feedback manner of the CBG according to the PDSCH in the prior art, where the base station feeds back A/A/N/A, it means the ever correctly demodulated CBG also feeds back the ACK even not scheduled any more. Hereinafter, the illustration is still made with N/A/N/N as an example). Then, when the base station adjusts the CWS of the downlink transmit burst A based on the HARQ_ACK fed back by the UE, the base station does not count up the HARQ_ACKs of CBG1 and CBG4; because although the HARQ_ACK fed back by the base station includes the HARQ_ACK of 4 CBGs, since the base station in the uplink transmit burst B only schedules CBG 2 and CBG 3, only the HARQ_ACK results of CBG 2 and CBG 3 are counted up, the percentage of ACKs is ½, rather than ¼; therefore, the CWS is still reset, without a need of increase.

(4.2) If the UE does not receive the explicit HARQ_ACK feedback of the PUSCH in the reference slot from the base station, or the UE does not receive the explicit HARQ_ACK feedback of respective CBGs of the PUSCH in the reference slot from the base station, e.g., the HARQ_ACK in DFI is configured with a granularity of TB, such that it cannot indicate the HARQ_ACK information of each CBG, while the UE only receives the UL grant of part of the CBGs of the PUSCH in the reference slot: for the CBG sent in the reference slot but the case where the UL grant does not include any retransmission or new transmission information about the CBG, the UE might not consider the impact of HARQ-ACK of the CBG on CWS adjustment; or, the UE needs to consider the impact of the CBG on CWS adjustment. Alternatively, if the UE needs to consider the impact of the CBG on CWS adjustment, it may assume that the HARQ_ACK of the CBG is ACK, or it may assume that the HARQ_ACK of the CBG is NACK, or it may use the HARQ_ACK in the received DFI as reference for the CWS adjustment. If the value of the NDI of the received UL grant is identified as ACK, e.g., the value of NDI toggled or NDI is equal to the value predefined to represent ACK, it is believed that the HARQ_ACKs of all CBGs of the PUSCH are all ACKs.

For example, the base station schedules the UE to send a complete TB over the PUSCH transmission sent by the uplink transmit burst C; the base station correctly decodes CBG1 and CBG4 of this TB, but fails to correctly decode the CBG2 and CBG3 of the TB. Although the base station schedules the UE to retransmit the CBG 2 and CBG 3 of this TB through the UL grant, in the UL grant, the NDI bit field is set to untoggle, and the 4 bits of CBG transport indicator bit field (CBGTI) are set to 0110, i.e., scheduling CBG2 and CBG3. According to one implementation manner, the UE determines the HARQ_ACK of the CBG of the PUSCH in the uplink transmit burst C only based on the CBG transport information explicitly indicated in the UP grant and the NDI. Namely, CBG2 and CBG3 are retransmission; then the total number of ACKs is 0, and the total number of HARQ_ACKs is 2; the percentage of ACK is 0; then, it is needed to increase the CWS. According to another implementation manner, the HARQ_ACK of unscheduled CBG is NACK; then, the total number of ACKs is 0, the total number of HARQ_ACKs is 4; the percentage of ACK is 0; then, it is needed to increase CWS. According to another implementation manner, the HARQ_ACK of the unscheduled CBG is ACK; then it is believed that the HARQ_ACKs of CBG 1 and CBG 4 are ACK, and the percentage of ACKs is 2/4=50%; then the CWS is reset.

Preferably, if the UE not only receives the UL grant, but also receives the explicit HARQ_ACK feedbacks of respective CBGs, then the UE determines CWS adjustment based on the explicit HARQ_ACK feedback. For example, the base station schedules the UE to send a complete TB over the PUSCH transmission sent by the uplink transmit burst C; the base station correctly decodes CBG1 of this TB, but fails to correctly decode the CBG 2, CBG 3, and CBG 4 of the TB. Afterwards, the UE receives the UL grant, indicating retransmission of CBG2 and CBG3 of this TB. in the UL grant, the NDI bit field is set to untoggle, and the 4 bits of CBG transport indicator bit field (CBGTI) are set to 0110, i.e., scheduling CBG2 and CBG3. Moreover, the UE receives the explicit HARQ_ACK feedback, indicating that the HARQ_ACKs of the 4 CBGs are A/N/N/N, respectively; then, based on the explicit HARQ_ACK feedback, the UE determines that the number of ACK is only 1; the total number of HARQ_ACKs is 4; and the percentage of ACK is 1/4. It needs to be noted that for a same CBG, if the information indicated in UL grant is inconsistent with the information of this CBG indicated in DFI, the HARQ_ACK needs to be determined based on the indication in UL grant. For example, in the UL grant, the 4 bits of CBG transport indicator bit field (CBGTI) are set to 0110, i.e., scheduling CBG2 and CBG3. Moreover, the UE receives the explicit HARQ_ACK feedback, indicating that the HARQ_ACKs of the 4 CBGs are A/A/N/N, respectively; then, for CBG2, UE should assume it to NACK.

Preferably, if UE not only receives the UL grant, but also receives the explicit HARQ_ACK feedback in a unit of TB, and if the UL grant indicates new transmission of a TB, then the UE believes that the HARQ_ACKs of all CBGs of the TB are all ACK; the HARQ_ACKs of this TB are ACKs; if the UL grant indicates retransmission of a TB, then the UE determines CWS adjustment based on the HARQ_ACKs of this TB indicated in the DFI, and the UE indicates retransmission based on the indication of UL grant. For example, the UE receives the UL grant indicating retransmission of the TB, while DFI indicates that the HARQ_ACK of the TB is ACK, then when performing CWS adjustment, UE believes that this TB is ACK. The base station generates the explicit HARQ_ACK in a unit of TB according to a predefined rule. For example, if a TB at least has one CBG to be ACK, then the HARQ_ACK of TB is ACK; or, if one TB at least has one CBG to be NACK, the HARQ_ACK of TB is NACK; or, the HARQ_ACK of one TB is determined based on the HARQ_ACK result with an earliest occurrence in the time domain, or the HARQ_ACK of one TB is determined based on whether the NACK percentage of the CBG has exceeded a predefined threshold, etc.

(4.3) If a UE does not receive an explicit HARQ-ACK feedback of the PUSCH including a reference slot as sent by the base station, but only receives a UL grant of part of CBGs of the PUSCH in the reference slot, for the CBG transmitted in the reference slot but the case that the subsequently received UL grant does not include any information about retransmission or new transmission of the CBG, the UE may adjust the CWS based on the total number of CBGs successfully transmitted in the last transmission as indicated in the UL grant.

In the UL grant, when the CBGTI indicates that the transmission of this time only includes part of CBGs, e.g., part of bits of the CBGTI is 0, or part of bits are indicated by joint codes of NDI and CBGTI, or indicated by extra bit fields; the base station may indicate the number of CBGs correctly demodulated by the base station using that part of bits in the MCS bit area. For example, 5-bit MCS bit area may indicate how many CBGs of last transmission are successfully demodulated by the base station using high 3 bits or low 3 bits or some specific MCS bit statuses. The 3 bits may indicate that the number of correctly demodulated CBGs is 0-7. It should be noted that the CBG indicated by the base station is only the number of CBGs actually transmitted by the UE in the last transmission, or only the number of CBGs scheduled by the base station in the last transmission.

For example, the base station schedules the UE to send a complete TB over the PUSCH transmission sent by the uplink transmit burst C; the base station correctly decodes CBG1 and CBG4 of this TB, but fails to correctly decode the CBG2 and CBG3 of the TB. Although the base station schedules the UE to retransmit the CBG 2 of this TB in the last uplink transmit burst B. In the UL grant, the NDI bit field is set to untoggle, and the 4 bits of CBG transport indicator bit field (CBGTI) are set to 0100, i.e., scheduling CBG2, and the MCS bit field indicates that the number of CBGs correctly demodulated is 2. Then, the total number of ACKs is 4, and the total number of HARQ_ACKs is 4; the percentage of ACK is 50; and the CWS is reset. For another example, the base station still fails to correctly demodulate CBG2, and schedules the UE to retransmit CBG2 in the uplink transmit burst A through the UL grant. In the UL grant, the NDI bit field is set to untoggle, and the 4 bits of CBG transport indicator bit field (CBGTI) are set to 0100, i.e., scheduling CBG2, and the MCS bit field indicates that the number of CBGs correctly demodulated is 0; then the percentage of ACK is 0/1=0, and the CWS increases.

(4.4) If, for a UE, a one-bit or multi-bit HARQ_ACK feedback of each TB, which may be used for CWS adjustment, is generated based on a predefined method from HARQ_ACK feedbacks of a plurality of CBGs scheduled in a same time. The predefined method may be:

(a) If among the HARQ_ACK feedbacks of a plurality of CBGs of one TB scheduled in a same time, there is at least one HARQ_ACK feedback of at least one CBG is ACK, then the HARQ_ACK of this TB is ACK; otherwise, the HARQ_ACK of this TB is NACK.

For example, in the reference slot, the base station sends a PDSCH for the 2 UEs, respectively. The PDSCH of UE1 includes 2 TBs, and the UE1 is configured as CBG-based transmission, wherein TB1 schedules 2 CBGs, and TB2 schedules 4 CBGs. The PDSCH of UE2 includes 1 TB, and UE2 is configured as TB-based transmission. Suppose 2 CBGs of TB1 of UE1 are NACK, NACK, and 4 CBGs of TB2 are ACK, NACK, NACK, ACK. The TB of UE2 is ACK. Then, the HARQ_ACKs for CWS adjustment are such that the TB1 of UE1 is NACK, the TB2 thereof is ACK, and the TB of UE2 is ACK; then, the percentage of NACK is 1/3, less than the predefined threshold 80%; therefore, the CWS is reset.

(b) If HARQ_ACK feedbacks of multiple CBGs of one TB scheduled in a same time are received, the HARQ_ACKs of the multiple CBGs are counted up by weight. The weight coefficient is the reciprocal of the number of CBGs.

For example, in the reference slot, the base station sends a PDSCH for the 2 UEs, respectively. The PDSCH of UE1 includes 2 TBs, and the UE1 is configured as CBG-based transmission, wherein TB1 schedules 2 CBGs, and TB2 schedules 4 CBGs. The PDSCH of UE2 includes 1 TB, and UE2 is configured as TB-based transmission. Suppose that 2 CBGs of TB1 of UE1 are NACK, NACK; then, the weight coefficients are 0.5*NACK, 0.5*NACK. Suppose that 4 CBGs of TB2 are ACK, NACK, NACK, ACK; then, the weight coefficients are 0.25*ACK, 0.25*NACK, 0.25*NACK, and 0.25*NACK. Suppose that the TB of UE2 is ACK; then, the weight coefficient is 1*ACK. Accordingly, the total number of HARQ_ACKs for CWS adjustment is 3, i.e., one HARQ_ACK for one TB, wherein the number of NACKs is 0.5+0.5+0.25+0.25+0.25=1.75. Then, the percentage of NACK is 1.75/3=7/12, less than the predefined threshold 80%; therefore, the CWS is reset.

(c) If HARQ_ACK feedbacks of multiple CBGs of one TB scheduled in a same time are received, the HARQ_ACK of each of the multiple CBGs is unanimously 1-bit HARQ_ACK. HARQ_ACKs of all CBGs and/or TBs in the reference slot are jointly counted up.

For example, in the reference slot, the base station sends a PDSCH for the 2 UEs, respectively. The PDSCH of UE1 includes 2 TBs, and the UE1 is configured as CBG-based transmission, wherein TB1 schedules 2 CBGs, and TB2 schedules 4 CBGs. The PDSCH of UE2 includes 1 TB, and UE2 is configured as TB-based transmission. Suppose 2 CBGs of TB1 of UE1 are NACK, NACK, and 4 CBGs of TB2 are ACK, NACK, NACK, ACK. Suppose that the TB of UE2 is ACK; then, the weight coefficient is 1*ACK. Then, the total number of HARQ_ACKs for CWS adjustment is 2+4+1=7. The number of NACKs is 2+1=3. Then, the percentage of NACK is 3/7, less than the predefined threshold 80%; therefore, the CWS is reset.

The methods (4.1)~(4.4) above may be used separately or in combination. For example, in conjunction with (a)s in (4.1)~(4.4), if part of the bit information of a CBG has not been sent or none of the bit information in the CBG has been sent, the HARQ_ACK of the CBG is not used for CWS adjustment. if in a plurality of HARQ_ACK feedbacks of a plurality of CBGs, including all bit information, of one TB scheduled once, there is an HARQ_ACK feedback of at least one CBG is ACK, then the HARQ_ACK of this TB is ACK; otherwise, the HARQ_ACK of this TB is NACK. For example, in the reference slot, the base station sends a PDSCH for the 2 UEs, respectively. The PDSCH of UE1 includes 2 TBs, and the UE1 is configured as CBG-based transmission, wherein TB1 schedules 2 CBGs, and TB2 schedules 4 CBGs. The base station only sends the CBG2 of TB1 and CBG3 and CBG4 of TB2. The PDSCH of UE2 includes one TB1, and the UE2 is configured as CBG-based transmission, wherein TB1 schedules 2 CBGs, and the base station only sends CBG2 of TB1. Suppose 2 CBGs of TB1 of UE1 are NACK, NACK, and 4 CBGs of TB2 are NACK, NACK, NACK, ACK. 2 CBGs of TB1 of UE are NACK, ACK. Then, the HARQ_ACKs of unsent CBG are first removed, namely CBG1 of TB1 of UE1, CBG1 of TB2 thereof, and 2 HARQ_ACKs, and HARQ_ACK of CBG1 of TB1 of UE2. Then, the calculated HARQ_ACKs available for CWS include: CBG2 NACK of TB1 of UE1, CBG3 of TB2, NACK and ACK of CBG4, and ACK of CBG2 of TB2 of UE2. For the TB2 of UE1, there is at least one ACK; then, the HARQ_ACK of this TB is ACK. Therefore, the HARQ_ACKs of TB1 and TB2 of UE1, and TB1 of UE2, are all ACKs. Then, the percentage of NACK is 0, less than the predefined threshold 80%; therefore, the CWS is reset.

(5) In a first slot of one transmit burst, the transmit burst possibly occupies one complete slot or only occupies part of a slot. In this slot, the PDSCH or PUSCH actually transmitted or received may be identical to the PDSCH or PUSCH expected to transmit, or possibly only part thereof. Apparently, in the two cases, the results of HARQ_ACK of the PDSCH or PUSCH might be different, and thus reflect the collisions among the transmitting parties with different extents. Through at least one of the following modes, it may be determined whether the first slot is eligible as a reference slot and the HARQ_ACKs of which PDSCHs or PUSCHs in the first slot may be used as reference for CWS adjustment:

(5.1) in the case that a UE is configured for CBG-based transmission, the HARQ_ACK of the UE may be used for CWS adjustment as long as in the reference slot, the UE has at least one CBG completely transmitted or has at least one CBG with a percentage of an actually transmitted portion thereof to the complete CBG exceeding a predefined threshold. According to the method described in method (4), the HARQ_ACK of a valid CBG is selected for CWS adjustment.

Preferably, the method described above is suitable for a scenario that the reference burst only includes one slot, or the reference slot only includes the first slot of the reference burst. If the reference burst includes a plurality of slots and/or the reference slot includes the first and second slots; all HARQ_ACK feedbacks in the reference slot may participate in CWS adjustment.

(5.2) in the case that a UE is configured for TB-based transmission, the HARQ_ACK of this UE may be used for CWS adjustment as long as the UE has one TB completely transmitted or has one TB with a percentage of a successfully transmitted portion thereof to the complete TB exceeding a predefined threshold.

Preferably, the method described above is suitable for a scenario that the reference burst only includes one slot, or the reference slot only includes the first slot of the reference burst. If the reference burst includes a plurality of slots and/or the reference slot includes the first and second slots; all HARQ_ACK feedbacks in the reference slot may participate in CWS adjustment.

Figure 13:
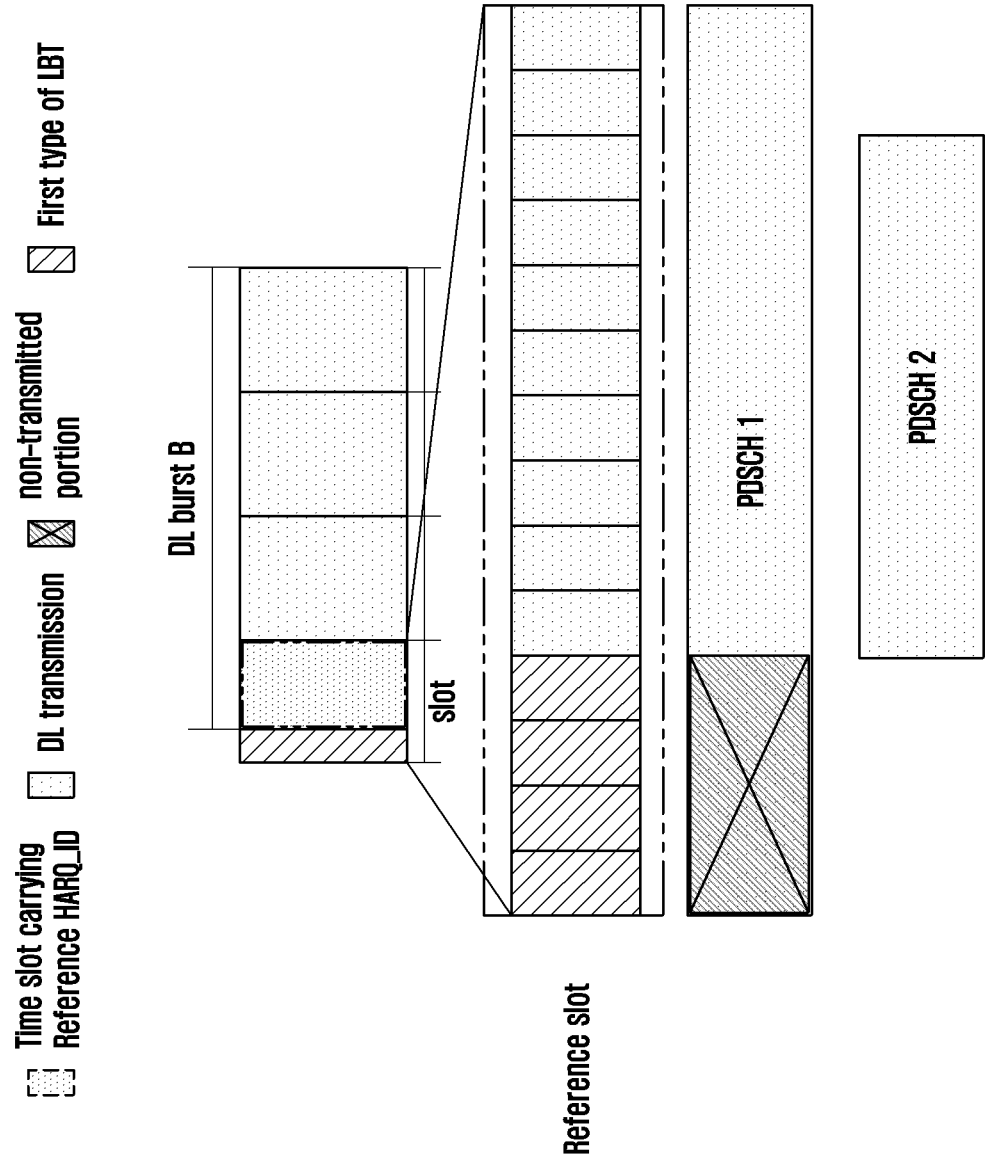
FIG. 13 schematically illustrates another example of resource occupancy for data transmission according to embodiments of the present disclosure.

As shown in FIG. 13, suppose that the threshold of the successfully transmitted portion to the entire TB is 80%. For example, in the reference slot, the base station sends two PDSCHs for two UEs, respectively; both of the two UEs are configured for TB-based transmission. Suppose that the scheduling PDSCH 1 in the DC 1 sent by the base station occupies a complete slot, i.e., 14 symbols, but the actual transmission only starts from the $5^{th}$ symbol, it may be assumed that the percentage of the actually transmitted portion to the complete TB is 10/14, not exceeding the predefined threshold. Suppose that the PDSCH 2 scheduled in the DC 1 sent by the base station occupies 7 symbols and the base station successfully sends the complete PDSCH 2 on the 7 symbols; it may be assumed that the percentage of the actually transmitted portion to the complete TB is 100%, exceeding the predefined threshold. Then, the PDSCH 1 is not used for calculating CWS, but the PDSCH 2 is used for calculating the CWS.

Preferably, for adjusting the CWS of uplink burst, if the first slot in the reference burst may have at least one valid HARQ_ACK according to the method of (5.2), the reference slot is the first slot; otherwise, it is the first slot and the second slot.

(6) In the reference downlink slot for the CWS, if a PDSCH is an Msg4 for a random-access process, then if the base station receives ACK of the PDSCH, the PDSCH_ACK may be used for CWS adjustment; while if the base station does not receive the HARQ_ACK feedback of the PDSCH, the HARQ_ACK of this PDSCH does not participate in the CWS adjustment. Because the UE may correctly demodulate this PDSCH, but the content for solving contention collision in the PDSCH does not match, the UE does not feed back ACK either. To avoid excessively increase the CWS, the HARQ_ACK of such PDSCH does not participate in the CWS adjustment.

(7) In the reference uplink slot for CWS, if one PUSCH is an Msg3 for a random-access process, then if UE receives the UL grant for re-scheduling Msg3 transmission, then UE believes that the previous HARQ_ACK of the Msg3 is NACK, which is used for adjusting the CWS.

The technical characteristics described above and the features in solutions (1)~(7) may be used separately or in combination.

Embodiment II

In the prior art, after the base station successfully completes the first type of LBT, the maximum time length available for downlink transmission in one downlink burst is MCOT. Moreover, the base station may share its downlink MCOT to UE. After successfully completing the first type of LBT, the base station starts continuously sending signals. Suppose the duration is $T_a$, $T_a \leq T_{mcot}$, the time length of MCOT. If $T_a < T_{mcot}$, the base station may indicate the UE to adopt 25 µs LBT; if the LBT is successful, the UE may send uplink to the base station, and the total length of the time occupied by sending the uplink signal does not exceed $T_b$, where $T_b = T_{mcot} - T_a$. The length of the MCOT is determined by the LBT priority type of the first type of LBT, and the MCOT length may include a plurality of 1 ms subframes. The base station may send an uplink subframe set of uplink signals based on the 25 µs LBT through an explicit signaling indication, i.e., explicitly indicating the length of the Tb time and the start point of the Tb time, which, for example, may be determined based on the "LAA uplink configuration" bit field in the C-PDCCH of Rel-14 LAA, i.e., indicating the start point of Tb through "uplink offset" and indicating the value of Tb through "UL duration." The base station may schedule uplink transmission of one or more UEs within the remaining Tb time. It is easily seen that within one MCOT, there only exists one UL/DL send switch point, and the DL transmission must be continuous without spacings; spacings may exist between UL and DL transmissions; the subsequent set of UL transmission subframes that may adopt 25 us LBT is continuous.

A new frame structure is introduced in the 5G system. An UL/DL switch point may appear in one slot. For example, the front $O_d$ number of symbols of one slot are DL transmission, while the later $Q_u$ number of symbols are UL transmission; the middle symbol is a flexible symbol, which may have no transmission, or may be dynamically switched to DL or UL transmission. One MCOT may include a plurality of slots; therefore, it likely occurs that one MCOT includes a plurality of UL/DL switch points.

Besides, the concept of BWP is also introduced in 5G. As described in Embodiment 1, one UE may be configured with a plurality of BWPs, while the BWP for each time of receiving or transmitting signals may be different; therefore, the frequency domain resource of the BWP or subband occupied by each time of UL or DL transmission might also be different.

Figure 14:
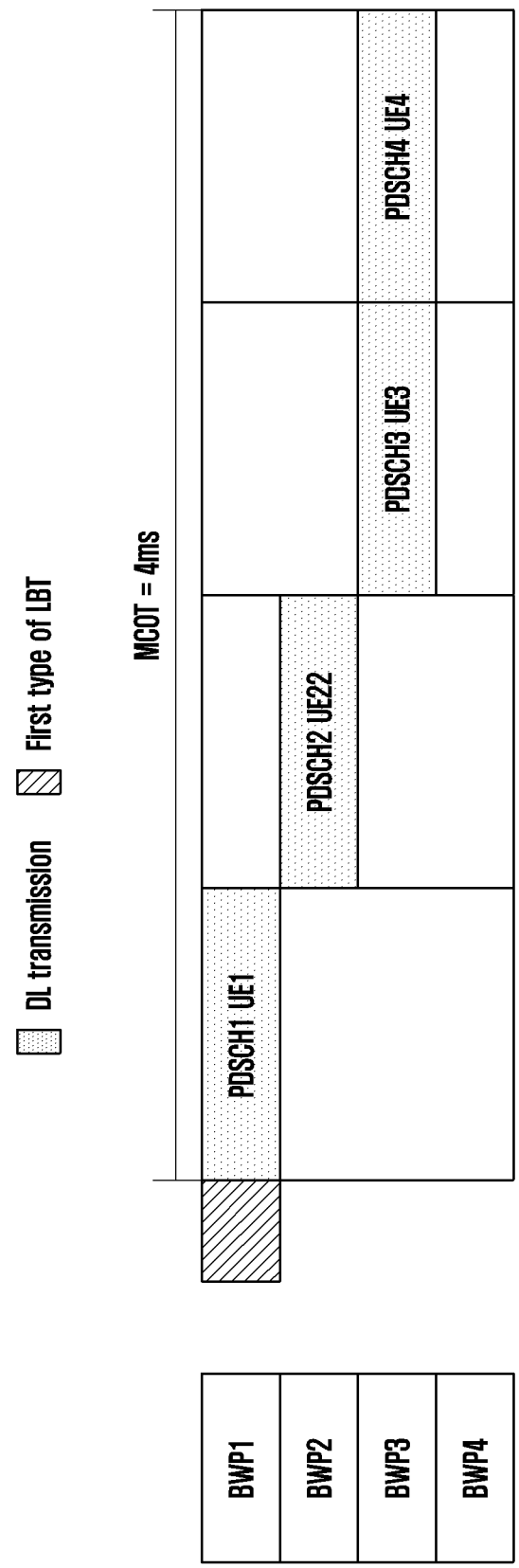
FIG. 14 schematically illustrates another example of resource occupancy for data transmission according to embodiments of the present disclosure.

For different slots or symbols within one MCOT, the frequency domain resource of the BWP or subband occupied by the base station to transmit DL signals might be different. Moreover, the frequency domain resource of the BWP for different UEs or for a same UE to transmit UL signals within one MCOT might also be different. If the frequency domain resources are different, but the base station still performs one time of first type of LBT before start of the MCOT, respective DL transmissions within the MCOT does not perform LBT or only performs the second type of LBT, and the UE also only performs the second type of LBT, it likely causes collision with other nodes on part of the BWP. For example, as shown in FIG. 14, suppose that one MCOT has a length of 4 ms, which may include 4 1 ms slots. The system bandwidth is 80 MHz, divided into 4 BWPs, 20 MHz each. The base station is expected to serve UE1, UE2, UE3, and UE4 on BWP1, BWP2, BWP3, and BWP 4 in the 4 slots, respectively. If the base station only performs the first type of LBT only on BWP 1 before start of the MCOT, after success, it starts sending PDSCHs 1~4 within the MCOT; it is very likely that BWPs 2/3 already has a being send WiFi but the base station fails to detect it, which causes collision between the PDSCHs on BWPs 2/3 and WiFi.

To avoid such collisions, LBT and DL transmission may be performed according to at least one of the following modes:

(1) Each DL transmission within one MCOT, e.g., PDSCH, PDCCH, reference signal, or undefined signal, etc., must be located on the same BWP or subband. The LBT before start of the MCOT may be performed on the BWP or subband.

Preferably, if an spacing exists between two adjacent DL transmissions within the MCOT, the second type of LBT needs to be performed before the next DL transmission, and the transmission is only enabled after success of the second type of LBT; or if the spacing is smaller than or equal to the predefined spacing threshold, it is allowed to direct send without performing LBT or to perform CCA shorter than the second type of LBT, e.g., 16 µs. If the transmitter within the MCOT changes the BWP, the first type of LBT needs to be re-performed before transmitting the DL signal on the new BWP, a new MCOT starts.

(2) Each DL transmission within one MCOT may belong to a different BWP or subband. The LBT before start of the MCOT may be performed on a union of BWPs or subbands. In one implementation manner, the bandwidth of the union of BWPs or subbands is used as the bandwidth of the LBT; when and only when the LBT is successful, can the MCOT be sent. In another implementation manner, LBTs are performed on respective BWOs or subbands within the union of BWPs or subbands, separately, and the corresponding PDSCHs are only transmitted on those BWPs or subbands with successful LBTs.

Preferably, if an spacing exists between two adjacent DL transmissions within the MCOT, the second type of LBT needs to be performed before the next DL transmission, and the transmission is only enabled after success of the second type of LBT; or if the spacing is smaller than or equal to the predefined spacing threshold, it is allowed to direct send without performing LBT or to perform CCA shorter than the second type of LBT, e.g., 16 µs. The second type of LBT may be performed on a frequency domain resource identical to the first type of LBT, or the second type of LBT may be performed on the BWP or subband where the subsequent uplink that needs continuous transmission is located.

Preferably, if two adjacent DL transmissions within the MCOT are performed on different BWPs or subbands, the second type of LBT needs to be performed before the next DL transmission, and the transmission is only enabled after success of the second type of LBT; or if the two DL transmissions are performed on the same BWP or subband and there is no gap in time, the LBT might not be performed.

Preferably, if two adjacent DL transmissions within the MCOT are performed on different BWPs or subbands, and the BWP or subband where the latter DL transmission is a subset of BWPs or subbands where the former DL transmission is located, and there is no gap in time or the spacing is smaller than or equal to a predefined spacing threshold, direct transmission without performing LBT is allowed; otherwise, a second type of LBT needs to be performed before the latter DL transmission, and the transmission is only enabled after success of the second type of LBT.

In the example shown in FIG. 15, a union of BWPs within one MCOT includes BWP1, BWP2, and BWP3; then the first type of LBT before start of the MCOT must be performed on the frequency domain resources of the three BWPs. Besides, a 25 μs LBT must be performed before PDSCH 2 and PDSCH 3. in this example, the LBT behavior of the UL transmission in the second slot is not limited.

(3) Each DL transmission within one MCOT may belong to a different BWP or subband. The LBT before start of MCOT is performed on a predefined bandwidth BW1, and the BW1 needs to include all of the BWPs or subbands. For example, the BW1 refers to a carrier bandwidth or a system bandwidth.

in the example shown in Fig. X1, BW1 is a carrier bandwidth of 80 MHz. Then, the LBT must be performed on the frequency domain resource of the entire 80 MHz. When and only when the LBT is successful, can the MCOT be sent. For another example, BW1 may be smaller than the carrier bandwidth, e.g., the carrier bandwidth is 80 MHz and the BW1 is 20 MHz; then the carrier bandwidth may be divided into 4 BW1. However, the DL BWP of UE may be smaller than 20 MHz, e.g., 10 MHz. The bandwidth BW1 frequency domain resource over which the LBT is located needs to include the DL BWP for sending the DL data.

Preferably, if an spacing exists between two adjacent DL transmissions within the MCOT, the second type of LBT needs to be performed before the next DL transmission, and the transmission is only enabled after success of the second type of LBT; or if the spacing is smaller than or equal to the predefined spacing threshold, it is allowed to direct send without performing LBT or to perform CCA shorter than the second type of LBT, e.g., 16 μs.

Preferably, if two adjacent DL transmissions within the MCOT are performed on different BWPs or subbands, the second type of LBT needs to be performed before the next DL transmission, and the transmission is only enabled after success of the second type of LBT; or if the two DL transmissions are performed on different BWPs or subbands and there is no spacing, the LBT might not be performed.

Preferably, if two adjacent DL transmissions within the MCOT are performed on different BWPs or subbands, and the BWP or subband where the latter DL transmission is a subset of BWPs or subbands where the former DL transmission is located, and there is no gap or the spacing is smaller than or equal to a predefined spacing threshold, direct transmission without performing LBT is allowed; otherwise, a second type of LBT needs to be performed before the latter DL transmission, and the transmission is only enabled after success of the second type of LBT.

(4) In the case that the base station shares its own DL MCOT to the UE, within one MCOT, if the BWP or subband where the UL transmission is located is the subset (including identical) of the BWPs or subbands where the base station performs DL transmission, the second type of LBT or no LBT may be performed before UL transmission of the UE; otherwise, the first type of LBT needs to be performed before UL transmission of the UE.

Preferably, the BWP or subband for the base station to perform DL transmission is a union of BWPs or subbands where all DL transmissions of the base station within one MCOT are located.

As shown in FIG. 16, before start of the DL MCOT, the base station performs LBT on BWP 1 and BWP 2, transmits DL signals, and schedules UE1 within the MCOT to transmit UL signals on BWP 1. Because BWP 1 is a subset including BWP 1 and BWP 2, UE 1 may perform the second type of LBT.

Figure 17:
FIG. 17 schematically illustrates another example of resource occupancy for data transmission according to embodiments of the present disclosure.

As shown in FIG. 17, in MCOT1, UE3 receives DL on DL BWP3; in MCOT2, UE1 receives DL and transmits UP on BWP1, and UE2 receives DL and transmits UL on BWP 2. UE3 transmits UL on BWP 3. The UL BWPs of UE 1 and UE 2 belong to a subset of BWPs for the base station to perform LBT before MCOT2; therefore, the 25 μs LBT may be performed; however, the UL BWP of UE 3 does not belong to the subset of the BWPs, the first type of LBT needs to be performed. If the base station sends, over BWP1 or BWP2, signaling indicating an UL slot set based on which the second type of LBT may be performed within the MCOT, UE3 cannot receive such signaling, because the DL BWP of UE3 is still over the BWP3; then the UE3 will perform the first type of LBT. Therefore, it is easy to see that according to a relatively simple implementation manner, if the UE receives, over the DL BWP corresponding to the UL BWP, the signaling indicating the UL slot set based on which the second type of LBT may be performed within the MCOT, the UE may use the second type of LBT within the UL slot set; in the case of failing to receive, the UE will perform the type of LBT indicated by UL grant or perform the first type of LBT. According to another implementation manner, if the scheduled UE cannot perform 25 μs LBT, the base station can only indicate the first type of LBT in the UL grant scheduling the UE. According to a further implementation manner, the base station explicitly indicates, through DL control signaling, on which BWP or subband the UE may perform 25 μs LBT. For example, BWP or subband information applicable to the UL slot set is indicated in signaling indicating the UL slot set based on the second type of LBT. The BWP or subband information is cell common information; the UE may determine, based on the cell common information, the applicable BWP or subband.

(5) In the case that the base station shares its own DL MCOT to the UE, within one MCOT, if the BWP or subband where the UL transmission is located is the subset (including identical) of the BWPs or subbands where the base station performs the first type of LBT before start of the MCOT, the second type of LBT or no LBT may be performed before UL transmission of the UE; otherwise, the first type of LBT needs to be performed before UL transmission of the UE.

If the base station needs to perform LBT on the system bandwidth before MCOT in conjunction with (3), the UE may always adopt the second type of LBT within the MCOT, because the UL transmission of BWP of the UE is constantly located within the system bandwidth.

As to how the base station indicate the UL subframe set over which a UL signal may be transmitted based on the 25 μs LBT within the downlink MCOT, the present disclosure makes no limitation.

What have been described above are mainly behaviors of not performing LBT, adopting the second type of LBT, the LBT, and signaling within the MCOT. If the UL or DL transmission within the MCOT is subjected to the first type of LBT before transmission, it may be assumed as belonging to different MCOTs, or even they belong to the same MCOT, they perform LBT and signal transmission according to the prior art or other methods. The present disclosure has no limitation thereto.

Besides, in the prior art, if the UE is scheduled or assigned an continuous uplink resource for continuous uplink transmission without gaps (i.e., no gap between these UL transmissions), the UE may only perform the first type of LBT once before the continuous UL transmission, and within the MCOT corresponding to the LBT, the UE may continuously perform UL transmission. However, considering that in the new scenario, the LBT frequency band resources corresponding to these frequency band resources for continuous UL transmission might be different. For example, if the BWPs or subbands occupied by these UL transmissions are different, the LBT subband resources are also different; then, these UL transmissions cannot be continuously transmitted. For example, the BWP bandwidth is 40 MHz, divided into 2 subbands, corresponding to 2 LBT subbands. UE is expected to send PUCCH over one subband in slot n and to transmit PUSCH over the entire BWP in the slot n+1, where the temporal resources for PUCCH and PUSCH are continuous without gaps. Then, if the UE only performs LBT over one subband and sends the PUCCH over one subband before the slot n, and if the UE intends to send PUSCH over the entire BWP in the slot n+1, the UE needs to perform the first type of LBT, or the UE can only send PUCCH over one subband in the slot n+1.

Embodiment III

In the prior art, after the UE successfully completes the first type of LBT, the maximum time length of the UL signal that may be transmitted in one UL burst cannot exceed the MCOT. Moreover, the UE may share the UL MCOT to the base station. Suppose the UE starts continuous UL transmission after successfully performing the first type of LBT with a duration of L. If $T_a<T_{mcot}$, the UE may indicate, in subframe n through UL control information, the base station that the LBT type available in the subframe n+X is the second type of LBT, where X is a high-layer configuration, or system predefined, or dynamically indicated. The base station may select not to send signals in the subframe n+x, or select to send signals based on the first type of LBT, or select to send signals based on the second type of LBT. If the base station sends signals based on the second type of LBT, the base station can only send, in this subframe, DL control signaling to the UE sending the UL control information, and the base station may also send DL control information to other UEs in the subframe; however, the base station cannot send a data channel, e.g., PDSCH.

As mentioned above, in the 5G system, the BWP occupied by each UE sending the UL signal or the BWP or subband for the UE to perform LBT might be different, and the frequency domain resources for the base station for different UEs to send DL signals might also be different. To avoid the DL signals sent by the base station after performing 25 μs LBT in the slot n+x from colliding with other nodes, the base station may perform LBT and signaling according to the method described below.

If the UL control information sent by the $UE_i$ as received by the base station indicates that the base station may perform 25 μs LBT in the slot n+X and the base station decides to send DL signals in the slot n+X and perform 25 μs LBT, at least the following conditions must be satisfied:

(1) The base station must send DL control signaling to the $UE_i$ in this slot and the DL BWP over which the DL control signaling is located is identical to the UL BWP over which the $UE_i$ sends the UL control information, or the frequency domain resource of the DL BWP over which the DL control signaling is sent is a subset of frequency domain resources over which $UE_i$ sends the UL control information.

(2) If the base station needs to further send DL control signaling to other UEs and the DL BWP over which the other UEs send the DL control signaling is identical to the UL BWP over which the $UE_i$ sends the UL control information, or the frequency domain resource of the DL BWP over which the DL control signaling is sent is a subset of frequency domain resources over which $UE_i$ sends the UL control information.

Or, at least the following conditions must be satisfied:

(3) The base station must send DL control signaling to $UE_i$ in this subframe and the DL BWP over which the DL control signaling is located is identical to frequency domain resource of the BWP or subband performed by $UE_i$ for sending the UL control information, or the frequency domain resource of the DL BWP over which the DL control signaling is sent is a subset of frequency domain resources of the BWP or subband of the UL LBT performed by the $UE_i$ to send the UL control information.

(4) If the base station needs to further send DL control signaling to other UEs, the DL BWP over which the DL control signaling is sent to the other UEs is identical to the frequency domain resource of the BWP or subband of the UL LBT performed by $UE_i$ to send the UL control information, or the frequency domain resource of the DL BWP over which the DL control signaling is sent is a subset of frequency domain resources of the BWP or subband of the UL LBT performed to send the UL control information to $UE_i$.

Preferably, the relationship between the frequency domain resource of the BWP or subband over which the UE performs UL LBT and the BWP over which the UE sends uplink; therefore, the base station may exactly know the resource of UL LBT.

Preferably, UE may notify the base station of the frequency domain resource of the BWP or subband where the UL LBT is located, e.g., through uplink control information.

Figure 18:
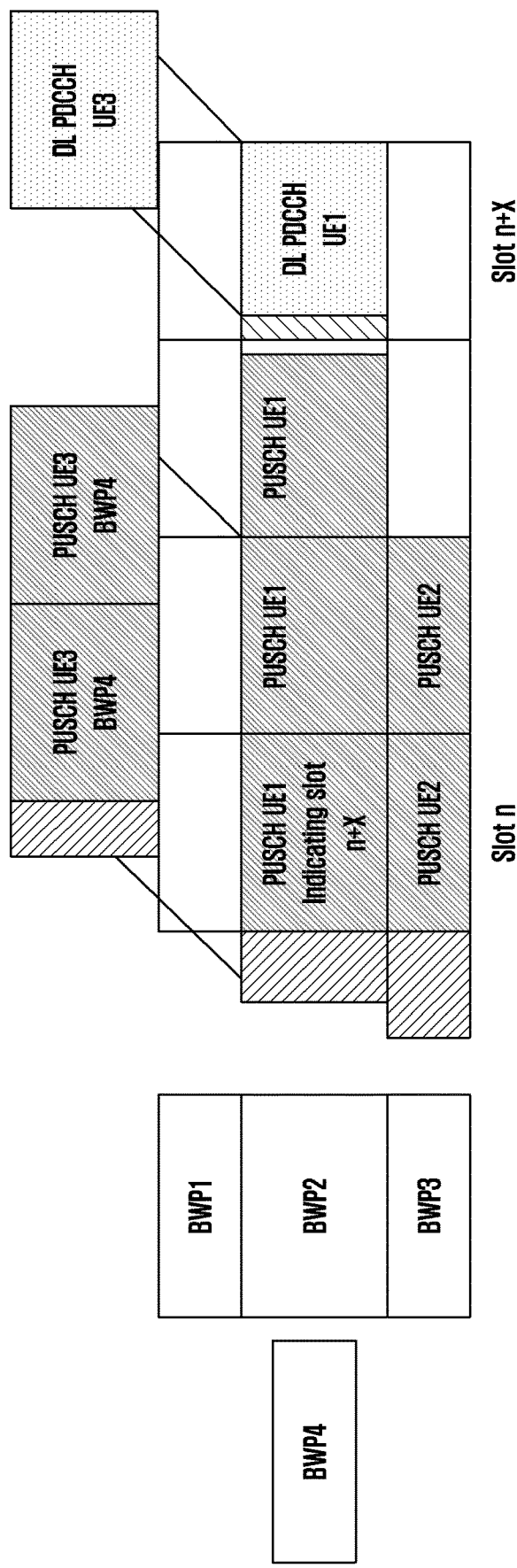
FIG. 18 schematically illustrates another example of resource occupancy for data transmission according to embodiments of the present disclosure.

As shown in FIG. 18, after completing the first type of LBT, UEs 1/2/3 send the PUSCH on the slot n after completing the first type of LBT, respectively, wherein the UE1 sends the PUSCH over the BWP 2, and indicates that the base station may adopt the second type of LBT in the slot n+X; the UE2 sends PUSCH over BWP3; the UE3 sends PUSCH over BWP4; and the frequency domain resource of BWP4 is the subset of BWP2. Then, in the slot n+X, the base station may adopt the second type of LBT, and sends PDCCH to the UE1 and UE3 over the BWP 2 and the BWP 4, respectively; however, the base station may not adopt the second type of LBT to send downlink control signaling to the UE2 over the BWP3.

Figure 19:
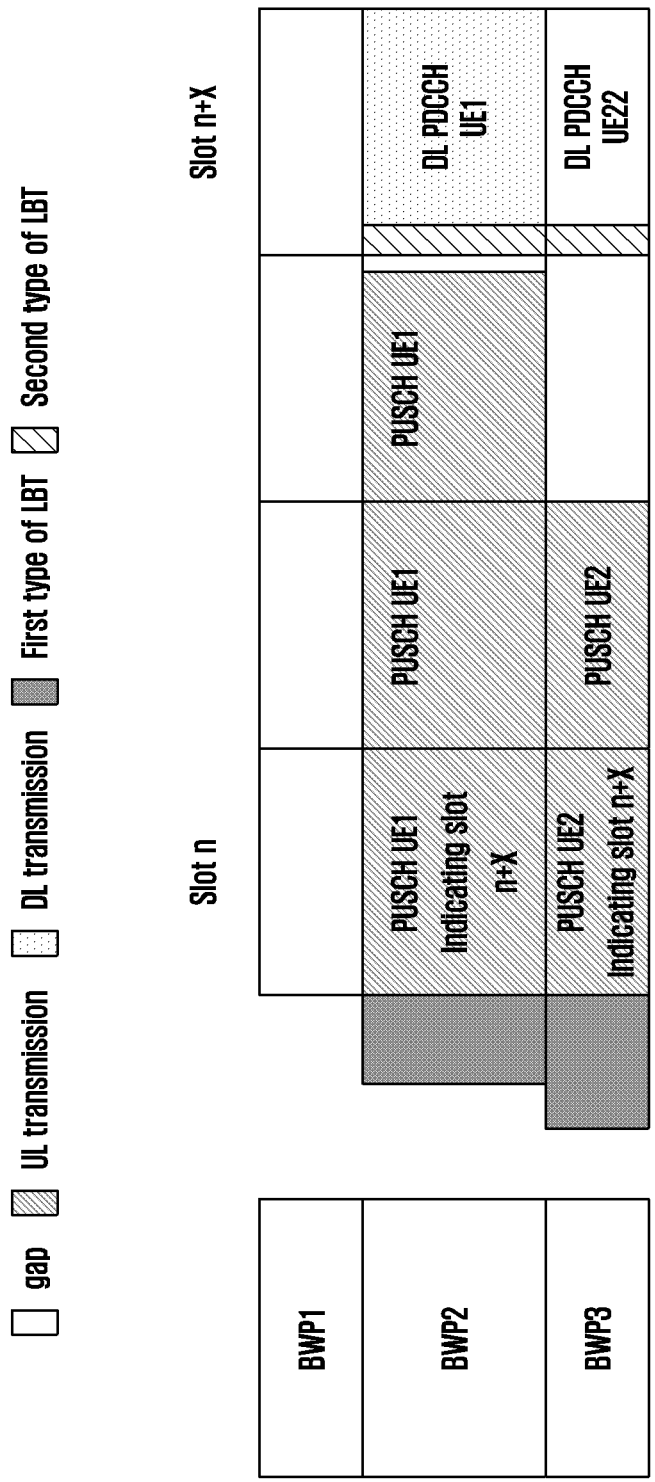
FIG. 19 schematically illustrates another example of resource occupancy for data transmission according to embodiments of the present disclosure.

Preferably, in the case that the base station receives the UL control information indicating the slot n+X as sent from a plurality of UEs, if the base station intends to send downlink control information to part or all of these UEs in the slot n+X based on the second type of LBT, the base station sends the DL control information to the corresponding UEs over the BWP of the corresponding UEs. As shown in FIG. 19, the DL control information sent to the $UE_i$ over the BWP of the $UE_i$ cannot be the DL control information sent to the $UE_i$ over the BWP of the $UE_j$, unless the frequency domain resources of the BWPs of the two UEs are identical.

Figure 20:
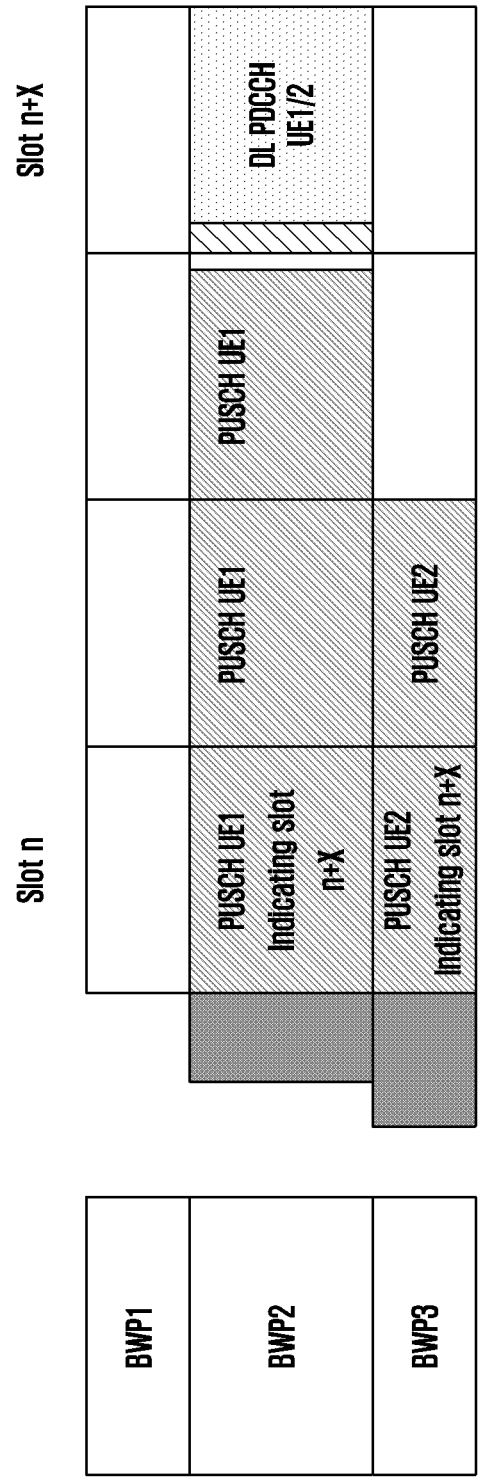
FIG. 20 schematically illustrates another example of resource occupancy for data transmission according to embodiments of the present disclosure.

Preferably, in the case that the base station receives the UL control information indicating the slot n+X as sent from a plurality of UEs, if the base station intends to send downlink control information to part or all of these UEs in the slot n+X based on the second type of LBT, the base station may send the DL control information to these UEs on any one or more BWPs in the union of BWPs of corresponding UEs. As shown in FIG. 20, the DL control information may be sent to $UE_j$ over the BWP of UEi.

Preferably, in the slot n+X, in the case of adopting the second type of LBT, the base station may send, in the slot, a reference signal for RRM measurement or for beam measurement, or a synchronization signal block SSB. If the base station receives the uplink control information indicating the slot n+X sent from a plurality of UEs, the base station may send the reference signal or SSB over the BWPs of the plurality of UEs.

To improve the probability channel occupancy by the base station, after the UEs described above send the uplink data successfully through the first type of LBT, a plurality of slots may be indicated for the base station to perform the second type of LBT, e.g., slots $n+X_0, n+X_1, \ldots n+X_P$. A sum of the total length of the slots for the second type of LBT and the time length occupied by the UE for sending uplink does not exceed the length of the MCOT. Then, the condition for the base station above to adopt 25 μs LBT may be extended to the slots $n+X_0, n+X_1, \ldots n+X_P$; for example, the BWP over which the base station sends the DL control signal in one or more slots in the slots $n+X_0, n+X_1, \ldots n+X_P$ and the BWP over which the UL control signal as sent is received shall satisfy the relationships above.

Preferably, the base station may send DL data to the UE sending the UL control signal in the slots $n+X_0, n+X_1 \ldots n+X_P$, and the BWP for the DL data and the BWP for the UL control signal satisfy the relationships described above.

Preferably, the UE may notify the base station of the LBT priority information used by the UE to perform the UL LBT, e.g., priority class, e.g., notifying the base station through the UL control information sent by the UE. The base station needs to determine the amount and priority of the data sent after adopting the 25 μs LBT based on the received priority class.

Embodiment IV

In the prior art, the base station may schedule the UE to receive the PDSCH in the slot n through the DL control signaling, and indicate, through the DL control signaling, the UE to feed back the HARQ_ACK of the PDSCH in the slot n+k1. In the licensed frequency band, UE may surely feed back the HARQ_ACK in the slot n+k1. However, in the unlicensed frequency band, because the UE needs to perform LBT before UL transmission and the transmission can only be made after success of LBT, UE cannot guarantee that the HARQ_ACK may be surely fed back in the slot n+k1. If the base station cannot obtain the HARQ_ACK, even the UE has correctly demodulated the PDSCH, the base station still can only re-schedule the PDSCH, which undoubtedly will deteriorate the system efficiency.

To increase the transmission probability of the HARQ_ACK, one feasible manner is to adopt a faster LBT, e.g., the second type of LBT. From the description of the MCOT in Embodiment 2, if the DL transmission occurs within the DL MCOT of the base station, the UE may perform the second type of LBT before sending the uplink. To enable the HARQ_ACK to be sent within MCOT, scheduling and transmitting of the HARQ_ACK may be performed according to steps below:

(1) Explicitly indicating, by the base station, a slot offset offset_1 through the HARQ_ACK timing bit field in the DL DCI for scheduling the DL PDSCH.

Preferably, the DL DCI may further indicate the effective time of the HARQ_ACK feedback. For example, the HARQ_ACK may be fed back in the $M_{timer}$ number of slots starting from the slot n.

Preferably, the DL DCI may further indicate that the slot for the base station to expect that the UE feeds back the HARQ_ACK is the slot n+offset_0 or the slot m+offset_1. Particularly, the slot n is the slot where the last symbol of PDSCH is located, and the slot m is the start point of the UL slot set available for 25 μs LBT within the MCOT. For example, this bit is referred to as trigger A. when this bit is valued 0, it indicates that the slot for feeding back the HARQ_ACK is slot n+offset_0; when this bit is valued 1, it indicates that the slot for feeding back the HARQ_ACK is the slot m+offset_1. If the bit is valued 1, step (3) is performed. If the bit is valued 0, the UE is ready to feed back the HARQ_ACK in the slot n+offset_0. Without this bit area, it is believed that the slot for feeding back the HARQ_ACK is the slot m+offset_1, and then step (3) is performed.

Preferably, it may be determined, based on the value of trigger A in the DL DIC, whether the HARQ_ACK timing bit field in the DL DCI indicates offset_0, or offset_1, and the $M_{timer}$.

(2) Sending, by the base station, DL control information including information indicating the set of UL slots available for the 25 μs LBT, wherein the information indicating the set of UL slots includes the start point position of the set and the length of the set.

Preferably, the DL control signaling may further indicate whether the UE in the slot m+offset_1 may feed back the HARQ_ACK in the UL slot set. For example, 1-bit individual indication (referred to as trigger B), which is valued 1, indicates that the start point of the UL slot set is the slot m; otherwise, the UL slot set cannot be used for this kind of UE to send the HARQ_ACK.

If the indication is that the start point of the UL slot set is the slot m, step (3) is performed; otherwise, step (4) is performed.

(3) Sending, by the UE, the HARQ_ACK in the slot m+offset_1.

Preferably, the UE performs the second type of LBT before sending the HARQ_ACK.

Preferably, the UE does not perform the second type of LBT or performs an LBT (e.g., 16 μs LBT) faster than the second type of LBT before sending the HARQ_ACK.

Preferably, if the slot m+offset/belongs to the UL slot set, the second type of LBT is performed; otherwise, the first type of LBT is performed.

(4) Not sending, by the UE, the HARQ_ACK in the UL slot set indicated in step (2).

It is easily seen that the base station may indicate a different offset/for a different UE so as to implement sending of the HARQ_ACK feedbacks of respective UEs in different UL slots. Of course, the base station may also indicate the same offset_1, so as to multiply HARQ_ACK feedbacks of respective UEs in an FDM or CDM manner or sending on different symbols in the same slot.

Preferably, the HARQ_ACK feedback includes the HARQ_ACKs of all DL HARQ processes configured by the base station for the UE. Preferably, for a certain HARQ process, if the base station schedules the PDSCH of the HARQ process more than once between the last HARQ_ACK feedback and this HARQ_ACK feedback of the UE, and the UE may generate HARQ_ACK bits based on the last decoding result capable of generating the PDSCH of the HARQ_ACK. In other words, if the time difference between the last received PDSCH and the feedback of the HARQ_ACK is smaller than an HARQ_ACK minimum processing time delay of the UE, then the UE feeds back the further preceding PDSCH HARQ_ACK satisfying the processing time delay, and the PDSCH HARQ_ACK is not included in the last HARQ_ACK feedback; otherwise, an occupancy bit NACK is generated. The inclusion refers to the HARQ_ACK generated based on the PDSCH decoded result, not including sending of occupancy bits. Preferably, for a certain HARQ process, the HARQ_ACK values fed back by the UE are identical within a segment of predefined time window; the HARQ_ACK values may vary beyond this time window. For example, the base station configures a time window for the HARQ_ACK feedback. If the UE does not report an actual HARQ_ACK value in the last HARQ_ACK feedback for a HARQ process, and if the UE is to send multiple HARQ_ACKs within this time window, the HARQ_ACK bits may be generated based on the PDSCH decoded result. For example, the length of the window has 4 slots. The UE sends HARQ_ACKs within the 2 slots thereof, respectively; for the HARQ process, UE generates the HARQ_ACK bits based on the PDSCH decoded results. If the base station re-triggers the UE to report the HARQ_ACK after end of this window and does not use the HARQ process to schedule the PDSCH transmission during this period, the UE feeds back the NACK later in the subsequent HARQ_ACK feedback for the HARQ process.

Preferably, the HARQ_ACK feedback includes the PDSCH HARQ_ACKs of the same offset_1 indicated by the base station. For example, the offset_1 of the plurality of PDSCHs may indicate a same value; moreover, based on the DAI sorting sequence (TS 38.213, Type-2 HARQ-ACK feedback) of the dynamic HARQ_ACK code book in the prior art, the value of DAI is indicated in the DL DCI scheduling these PDSCHs, e.g., counter DAI and/or total DAI; the UE determines, based on the DAI, the size of the HARQ_ACK codebook and the bit position of the HARQ_ACK bit of each PDSCH in the codebook.

Figure 21:
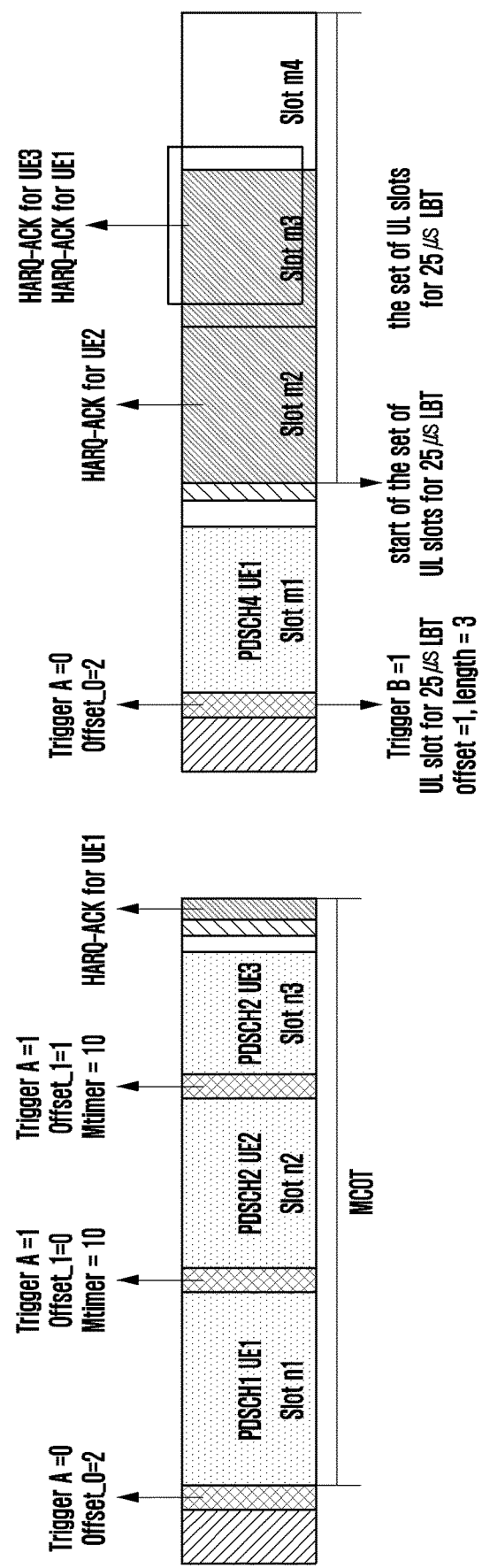
FIG. 21 schematically illustrates another example of resource occupancy for data transmission according to embodiments of the present disclosure.

As shown in FIG. 21, the base station sends the DL DCI scheduling the PDSCH 1 in slot n1, where trigger A=0, it indicates that the HARQ_ACK feedback slot of the PDSCH 1 is time slot n1+offset_0, where offset_0=2. In the slot n2, the base station sends the DL DCI scheduling the PDSCH 2, wherein trigger A=1, it indicates that the HARQ_ACK feedback slot of PDSCH 1 is slot m2+offset_1, where offset_1=2; in slot n2, the base station sends the DL DCI scheduling the PDSCH 3, wherein trigger A=1, which indicates that the HARQ_ACK feedback slot of PDSCH 1 is the slot m2+offset_1, where offset_1=1. Then, UE1 feeds back the HARQ_ACK of PDSCH 1 at the end of slot n3. In slot m1, the base station sends the DL DCI scheduling the PDSCH 4, where trigger A=0, it indicates that the HARQ_ACK feedback slot of the PDSCH 4 is slot m1+offset_0, where offset_0=2. In slot m1, the base station further sends C-PDCCH, where trigger B=1, indicating that the start point of the UL set available for 25 μs LBT is slot m2, and the length includes 3 slots. Then, UE2 feeds back the HARQ_ACK in slot m2, UE2 feeds back the HARQ_ACK in slot m3, and UE1 feeds back the HARQ_ACK in slot m3.

Another method of increasing the HARQ_ACK feedback opportunity is that the PDSCH HARQ_ACK within one slot is fed back on the UL resource in this slot. This UE may adopt the second type of LBT or does not perform the LBT to send the HARQ_ACK. The HARQ_ACK may include: HARQ_ACKs of all HARQ processes (as to how to specifically determine the values of HARQ_ACKs, the methods described above are likely applicable, which will not be described in detail here); or the number of bits and positions of bits of the HARQ_ACK determined based on the values of counter-DAI and total-DAI of the DCI in this slot, or the number of bits and positions of bits of the HARQ_ACK determined based on the maximum number of PDSCHs transmittable and having time to feed back the HARQ_ACK in this slot; for example, it may be determined based on a PDSCH Time Resource Allocation Table that one or more PDSCHs without overlapping may be sent at most in one slot, and the PDSCH for feeding back the HARQ_ACK in this slot may be determined from these non-overlapped PDSCHs based on a minimum processing time delay of the UE.

Another method of increasing the HARQ_ACK feedback opportunity is that the HARQ_ACK of the PDSCH in one DL transmit burst is fed back over an uplink resource in the MCOT of this Dl transmit burst. This UE may adopt the second type of LBT or does not perform the LBT to send the HARQ_ACK. The HARQ_ACK may include: HARQ_ACKs of all HARQ processes; or the number of bits and positions of bits of the HARQ_ACK determined based on the values of counter-DAI and total-DAI of the DCI in this burst, or the number of bits and positions of bits of the HARQ_ACK determined based on the maximum number of PDSCHs transmittable and having time to feed back the HARQ_ACK in this burst; for example, the number of DL slots is determined based on the possible HARQ_ACK time set K1, and one or more PDSCHs without overlapping may be sent at most in one slot may be determined based on a PDSCH Time Resource Allocation Table, and the PDSCH that may feed back the HARQ_ACK in this downlink slot may be determined from these non-overlapped PDSCHs based on a minimum processing time delay of the UE.

A further method of increasing the HARQ_ACK feedback opportunity is that the HARQ_ACK may be sent on the UL transmit carrier through a 25 μs LBT or without performing LBT. In the prior art, on the licensed frequency band, if the resource for sending the PUCCH and the resource for sending the PUSCH overlap in time, the PUSCH may not be sent; instead, the PUSCH is sent. If there are a plurality of PUSCHs overlapping with PUCCH in time, the PUSCH on a carrier with the smallest carrier index value is selected to send, and the priority of the schedule-based PUSCH is higher than the autonomously sent PUSCH. However, in the unlicensed frequency band, it might occur that the PUSCH on the carrier with a large carrier index may be sent using the 25 μs LBT in the carrier DL MCOT or without performing LBT, while the PUSCH on the carrier with a small carrier index needs to perform the first type of LBT. In this case, if the HARQ_ACK is still borne on the PUSCH on the carrier with a small carrier index, the opportunity of sending the HARQ_ACK might be lost due to LBT failure. Therefore, when the uplink control information is borne by PUSCH, a rule of selecting the PUSCH at least comprises:

Select Criterion #1: the priority of PUSCH that may be sent without performing LBT>the priority of the PUSCH that is sent by performing 25 μs LBT.

Preferably, the PUSCH that may be sent without performing LBT refers to the PUSCH on the licensed frequency band carrier.

Preferably, the PUSCH that may be sent without performing LBT refers to the PUSCH that needs no performance of LBT as indicated by UL grant.

Preferably, the PUSCH that is sent using 25 μs LBT is a PUSCH of 25 μs LBT that is indicated by UL grant.

For example, the base station schedules the UE to transmit HARQ_ACK information in slot n, and the base station schedules the UE, through the UL grant, to transmit PUSCH 1 on the carrier 1 in the slot n, and the base station indicates the LBT type as the first type of LBT, i.e., Cat 4 LBT; the base station schedules, through the UL grant, the UE to send PUSCH 2 on the carrier 2 in the slot n and indicates the LBT type as 25 us LBT. Then, the UE carries the HARQ_ACK information through PUSCH 2.

According to another implementation manner, preferably, the PUSCH that may be sent without performing LBT refers to the PUSCH that is indicated, through a common signaling, by the base station to be within the DL MCOT without a need of performing LBT. Preferably, the PUSCH that is sent using 25 μs LBT is a PUSCH that is indicated, through a common signaling, by the base station to be within the DL MCOT and is only required to perform 25 μs LBT.

For example, the base station schedules the UE to transmit HARQ_ACK information in slot n, and the base station schedules the UE, through the UL grant, to transmit PUSCH 1 on the carrier 1 in the slot n, and the base station indicates the LBT type as the first type of LBT, i.e., Cat 4 LBT; the base station schedules, through the UL grant, the UE to send PUSCH 2 on the carrier 2 in the slot n and indicates the LBT type as the first type of LBT. Moreover, the base station sends control information on the carrier 2 before the slot n, indicating that the slot n is within the DL MCOT, i.e., the UE may send PUSCH 2 on the carrier 2 using 25 us LBT in the slot n. Then, the UE carries the HARQ_ACK information through PUSCH 2.

When it is determined based on the Select Criterion #1 that a plurality of high-priority PUSCH exist, selection may be made among the plurality of PUSCHs according to other select criteria. For example, the priority of the scheduled PUSCH is higher than the autonomously sent PUSCH, and the priority of a carrier with a small carrier index value is higher than a carrier with a large carrier index value, etc. Or, other priority criteria are first executed. For example, the priority of scheduled PUSCH is higher than the autonomously sent PUSCH; if a plurality of the high-priority PUSCHs exist, the priority may be determined according to the Select Criterion #1.

According to a further implementation manner, if the LBT used by the PUCCH is faster than the LBT used by PUSCH, e.g., the PUCCH needs not perform LBT or the PUCCH performs 25 μs LBT; while PUSCH is the first type of LBT, then HARQ_ACK is sent through PUCCH, not carrying the HARQ_ACK on the PUSCH. If the UE has no capability to send PUCCH and PUSCH together, he abandons sending of the PUSCH; if he has capability to send them together, he sends the PUSCH not including the HARQ_ACK.

Another method of increasing the opportunity of feeding back a HARQ_ACK is to increase the times of being capable of sending HARQ_ACK within a certain period of time, while during this period of time, the UE actually only needs to successfully send the HARQ_ACK once. Specifically, (1) the base station may send the DL DCI in the slot n and indicate, in the DL DCI, the HARQ_ACK timing k1, i.e., indicating the UE to attempt, in priority, to send the HARQ_ACK in the slot n+1;

(2) the base station may further configure the UE such that the UE autonomously attempt to send uplink resources of the HARQ_ACK, e.g., individually configuring a set of PUCCH resources. Configuring of the PUCCH resources may include: periodicity and time offset information, or periodicity+time offset information+available slot in the period, and the symbols occupied by the PUCCH resources, resource block RB, and codeword resource (if necessary).

Preferably, the temporal resource of the PUCCH may overlap with the temporal domain resource and/or frequency domain resource of the configured autonomously transmitted PUSCH. When the UE has a need to transmit HARQ_ACK, sending of the PUCCH is guaranteed in priority, or the HARQ_ACK is carried in the PUSCH.

(3) the UE first attempts to send the HARQ_ACK in the slot n+k1. If the UE fails to send the HARQ_ACK in the slot n+k1, the UE may attempt to send the HARQ_ACK on the uplink resource over which the HARQ_ACK is subsequently autonomously attempted to send.

Preferably, the effective period of the HARQ_ACK may be configured by the base station or predefined or indicated by the base station in the DL DCI.

Preferably, the start point of the effective period is slot n+k1.

Preferably, the UE only autonomously attempts to send the HARQ_ACK on the uplink resource of the HARQ_ACK within the effective period, and does not attempt to send the HARQ_ACK after the effective date; however, the base station may schedule a new PDSCH and the UE may re-start to attempt to send the new HARQ_ACK in the newly indicated slot n+k1.

Preferably, the HARQ_ACK feedback includes the HARQ_ACKs of all DL HARQ processes configured by the base station for the UE. Preferably, the HARQ_ACK feedback includes the HARQ_ACKs of the same PDSCHs feeding back the HARQ_ACKs in the slot n+k1 as indicated by all base stations. Preferably, the HARQ_ACK feedback includes all possible HARQ_ACKs of the PDSCHs feeding back the HARQ_ACKs in the slot n+k1. A specific method may reuse a semi-static HARQ_ACK codebook (TS 38.213, Type-1 HARQ-ACK feedback) in the prior art, or according to the method of the present disclosure, or other method.

Figure 22:
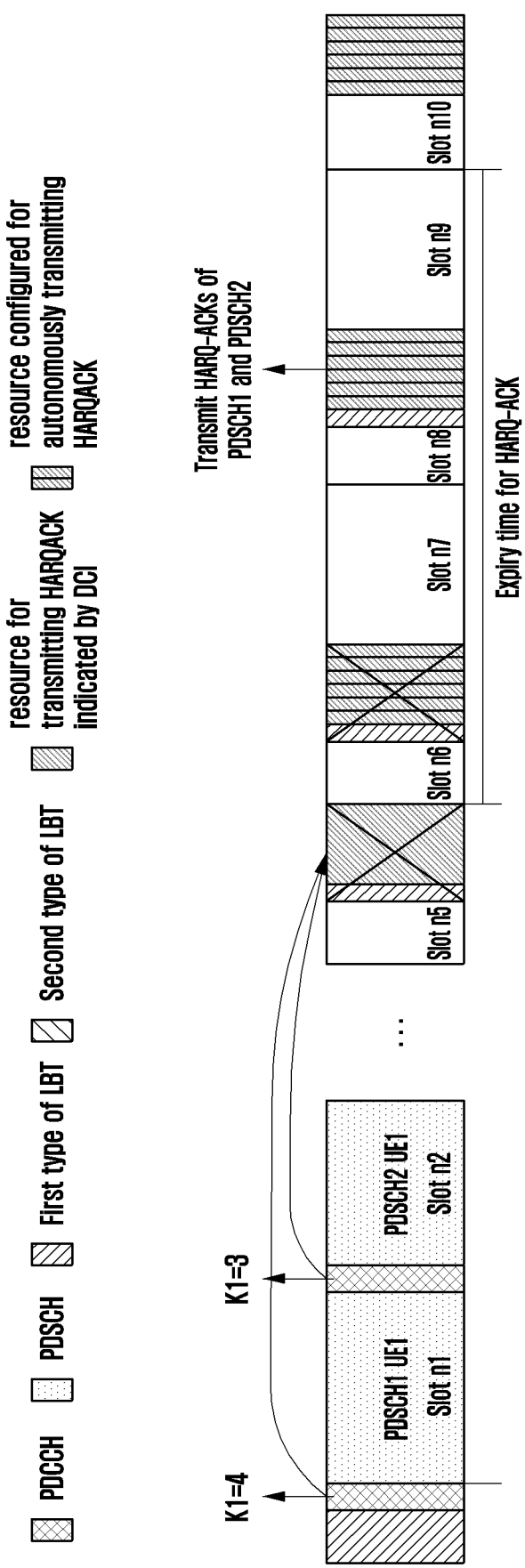
FIG. 22 schematically illustrates another example of resource occupancy for data transmission according to embodiments of the present disclosure.

As shown in FIG. 22, the base station sends the DL DCI scheduling the PDSCH 1 in slot n1, where k1=4, it indicates that the HARQ_ACK feedback slot of the PDSCH 1 is time slot n5; in slot n2, the base station sends the DL DCI scheduling the PDSCH 2, where k1=3, indicating that the HARQ_ACK feedback slot of PDSCH 1 is slot n5. The UE first attempts to send HARQ_ACK in slot n5. Due to failure of LBT, transmission is impossible; then, the UE starts to attempt to send HARQ_ACK on the resources autonomously sending the HARQ_ACK in slots n6 and n8. Because the slot n10 has exceeded the expiry time of the HARQ_ACK, UE will not attempt to send the HARQ_ACKs of PDSCH 1 and PDSCH 2 on the resources autonomously sending the HARQ_ACKs in slot n10. The UE successfully completes the LBT on the resource of the slot n8 to send the HARQ_ACK.

This not only guarantees that the base station can receive the HARQ_ACK feedback but also enables retransmission based on HARQ_ACK. For example, the base station may trigger retransmission of all HARQ_ACK processes by scheduling the UL grant for UL transmission. 1-Bit DAI in the existing DCI 0_1 may be used to indicate whether the UE needs to send the HARQ_ACK codebook in the PUSCH scheduled on the DCI 0_1. In the HARQ_ACK codebook, for the HARQ process that never successfully sends the HARQ_ACK, the HARQ_ACK is fed back according to an actual decoding result, and other HARQ processes feed back the occupancy bit NACK.

Preferably, the base station may indicate according to which manner the UE feeds back the HARQ_ACK; for example, the base station may independently use one DCI to support retransmission of the above described HARQ_ACK, or transmission of HARQ_ACKs of all HARQ processes; while in other circumstances, according to which manner the HARQ_ACK is fed back, e.g., only feeding back the HARQ_ACK of the PDSCH in one DL burst.

Embodiment V

On the unlicensed frequency band, the UL transmission scheduled by the base station requires success of both DL LBT performed by the base station and the UL LBT performed by the UE, such that the UE may transmit the scheduled PUSCH, which greatly lowers the transmission probability. Therefore, on the unlicensed frequency band, the base station may configure the UE to perform autonomous transmission, i.e., the base station configures for the UE the resource autonomously transmitted uplink; the base station may activate the UL autonomous transmission of the UE through physical layer signaling, or after the base station completes the UL autonomous transmission resource configuration to the UE, the UE may perform UL transmission on the autonomous transmission resource as needed.

When the base station configures the plurality of BWPs for the UE, the base station may configure the autonomous transmission resource for the UE over one or more BWPs.

After the UE autonomously transmits the PUSCH over one BWPx, in the case of switch to another BWPy, the autonomous retransmission timer is determined based on the autonomous retransmission timer configured for BWPx. For example, the base station configures the autonomous transmission resources for BWP1 and BWP2, respectively; the configured autonomous transmission resource at least includes temporal resource, RNT1, HARQ_ID, and retransmission timers (denoted as retransmission timer 1 and retransmission timer 2, respectively). After the UE autonomously transmits PUSCH 1 over BWP 1, the UE starts retransmission timer 1; if UE is switched to BWP 2 before stop of the retransmission timer 1, the UE may continue operating the retransmission timer 1. After stop of the retransmission timer 1, if the HARQ_ACK feedback of the PUSCH 1 has not been received yet or the UL grant of the HARQ process identical to the PUSCH 1 is scheduled, the UE retransmits the PUSCH 1 over the autonomous transmission resource of BWP 2. If the HARQ_ACK feedback of PUSCH 1 has been received or the UL grant of the HARQ process identical to the PUSCH 1 is scheduled before stop of the retransmission timer 1, the retransmission timer 1 is stopped. If the retransmission PUSCH 1 or new transmission PUSCH 2 is autonomously sent on BWP 2, the retransmission timer 2 of BWP 2 is started.

In an actual system, if the BWP currently sent or received by UE changes, the base station is required to send active signaling on the new BWP to activate the autonomous transmission resource on the new BWP. In this case, an implementation manner is that the retransmission timer 1 on the original BWPx stops, till the UE receives the autonomous transmission resource active signaling of the new BWPy, and then the retransmission timer 1 continues running. For example, after the UE autonomously transmits PUSCH 1 over BWP 1, the UE starts retransmission timer 1; if the UE receives an indication of switching to BWP2 before the retransmission timer 1 stops, the retransmission timer is pending from the end of the indication, till the UE receives the autonomous transmission resource active signaling of the new BWP 2, and then starts continuing running the retransmission timer 1. After stop of the retransmission timer 1, if the HARQ_ACK feedback of the PUSCH 1 has not been received yet, the UE retransmits the PUSCH 1 over the autonomous transmission resource of BWP 2. If the HARQ_ACK feedback of PUSCH 1 has been received before stop of the retransmission timer 1, the retransmission timer 1 is stopped. If the retransmission PUSCH 1 or new transmission PUSCH 2 is autonomously sent on BWP 2, the retransmission timer 2 of BWP 2 is started. According to another implementation manner, once the retransmission timer 1 starts being actuated, the retransmission timer 1 continues running irrespective of when the UE receives the autonomous transmission active signaling of BWP2. If the UE has switched to BWP2 upon end of the retransmission timer 1, but the base station has not sent the autonomous transmission active signaling of BWP2 yet, the UE needs to wait for the base station to send the active signaling, retransmission is performed to PUSCH 1 on the autonomous transmission resource.

In another actual system, if the BWP currently sent or received by UE changes, on the new BWP, the base station is not required to send active signaling on the new BWP to activate the autonomous transmission resource on the new BWP. In this case, an implementation manner is that the retransmission timer 1 on the original BWPx continues running. If the UE has switched to BWP2 upon end of the retransmission timer 1, the UE may retransmit the PUSCH 1 over the autonomous transmission resource of BWP2.

If the base station transmits, through the DFI over the BWPx, the PUSCHHARQ_ACK information of the UE and the HARQ process included in the DFI has the PUSCH sent over BWPy, the HARQ_ACK information of the PUSCH is set to NACK. The NACK information is not for CWS adjustment, not for determining whether the PUSCH of the HARQ process needs autonomous retransmission. For example, suppose there are 16 HARQ processes in total, the DFI including 16-bit HARQ_ACK information. The UE transmits PUSCH 1 of HARQ process 1 over BWP 1, PUSCH 2 over HARQ process 3, and then switches to BWP2 to send PUSCH 3 of HARQ process and PUSCH 4 of HARQ process 10. Suppose the base station correctly receives the 4 PUSCHs. Then, the HARQ_ACK bits in the AUL-DFAI are NANNNNNNNA. Suppose PUSCH 1 and PUSCH 2 are autonomously sent. Although the UE receives that the HARQ_ACKs of PUSCH 1 and PUSCH 2 are NACK, the UE does not immediately attempt to retransmit PUSCH 1 and PUSCH 2; instead, the UE continues running retransmission timer 1; if the timer 1 stops but the UE does not receive the UL grants including schedule information of the HARQ processes identical to PUSCH 1 and/or PUSCH 2, the UE may attempt to transmit PUSCH 1 and PUSCH 2 on the autonomous transmission resource of BWP 2. If the UE receives the UL grant of the schedule information including the HARQ process identical to PUSCH 1 and/or PUSCH 2, new transmission or retransmission is performed based on the UL grant. According to another implementation manner, the HARQ_ACK information in the DFI is not affected by BWP switch, the HARQ_ACK information is constantly generated based on the demodulation result (the PUSCH having not fed back the HARQ_ACK information yet) of the last received PUSCH. In the example above, the HARQ_ACK bits in the DFI include AAANNNNNNA. The UE determines whether the PUSCH of the HARQ process needs autonomous retransmission based on the indicated HARQ_ACK. For example, for the HARQ process of NACK, the UE may autonomously retransmit on the new BWP.

The base station may configure a CWS adjustment timer (Contention Window Size adjustment timer) for the UE. This timer is identical to respective BWPs, or the base station may configure the CWS adjustment timer for respective UEs, where the timers of respective BWPs may be identical or different. After the UE sends an UL burst Ti after completing the first type of LBT on one BWPx, if it is switched to another BWPy, the CWS adjustment timer is determined based on the CWS adjustment timer configured for BWPx. If UE does not receive the HARQ_ACK information (e.g., DFI) of the PUSCH within X slots starting from the first slot of the UL burst Ti o from the first PUSCH or receive the UL grant of the same HARQ process scheduling the PUSCH, the CWS is adjusted to a next larger value. The X may be a maximum value of the CWS adjustment timer and (slot length of the uplink burst Ti plus 1). In the Embodiment 1, considering that the interference conditions on different BWPs are different, it is relatively reasonable to adjust the CWS only based on the UL burst of the current BWP. Similarly, a first type of LBT is adopted between a plurality of previous transmit bursts $\{T0, \ldots T_n\}$; however, these bursts belong to different BWPs, e.g., bursts T0 and T1 belong to BWP1, and bursts T2 and T3 belong to BWP2; if in the actual slot of T2 or T3 or after X slots from the start of PUSCH, the HARQ_ACK information of the first PUSCH of the burst T0 or T1 is received, but the HARQ_ACK information of the first PUSCH of T2 or T3 is not received, irrespective of the value of the HARQ_ACK information of the first PUSCH of the burst T0 or T1, the CWS is unanimously adjusted to a next larger value.

When the UE performs autonomous retransmission, if the DFI including the control information of the HARQ_ACK of PUSCH includes the HARQ_ACK information of respective CBGs, the UE may perform autonomous retransmission with TB-based granularity or CBG-based granularity based on the HARQ_ACK information indicated in the DFI. More preferably, UE may only retransmit part of CBGs in one PUSCH, the part of CBGs correspond to the CBGs whose HARQ_ACK values corresponding to this PUSCH in the DFI are NACK. For example, for the HARQ process i, suppose the PUSCH includes 4 CBGs, the HARQ_ACKs indicated in the DFI are NNAA; then the UE may autonomously retransmit the first and second CBGs. More preferably, when the UE autonomously retransmits the PUSCH, the indication information of the CBG may be included in the UCI, for notifying the base station of the CBG information for this retransmission. An advantage of such a practice is that inconsistency between the understandings of the CBGs of NACK in the DFI at the UE side and the base station side caused by misdetection of DFI by the UE may be avoided, thereby avoiding the inconsistency between the CBG actually placed in the UE and the CBG expected by the base station. In another implementation manner, if there is at least one CBG in the PUSCH whose HARQ_ACK is indicated as NACK in the DFI, the UE performs retransmission with TB-based granularity, i.e., retransmitting the entire TB. Preferably, when the UE autonomously retransmits the PUSCH, the CBG information needs not be included in the UCI.

The method for data transmission according to the present disclosure has been described in detail through preferred embodiments. It should be understood that the method illustrated above is only exemplary. The method of the present disclosure is not limited to the steps and sequences illustrated above. Besides, the steps of the method illustrated above may be executed through corresponding modules in a corresponding apparatus, or executed through a combination of hardware and program instructions. Those skilled in the art may be subjected to many variations and modifications according to the teachings in the embodiment.

Figure 23:
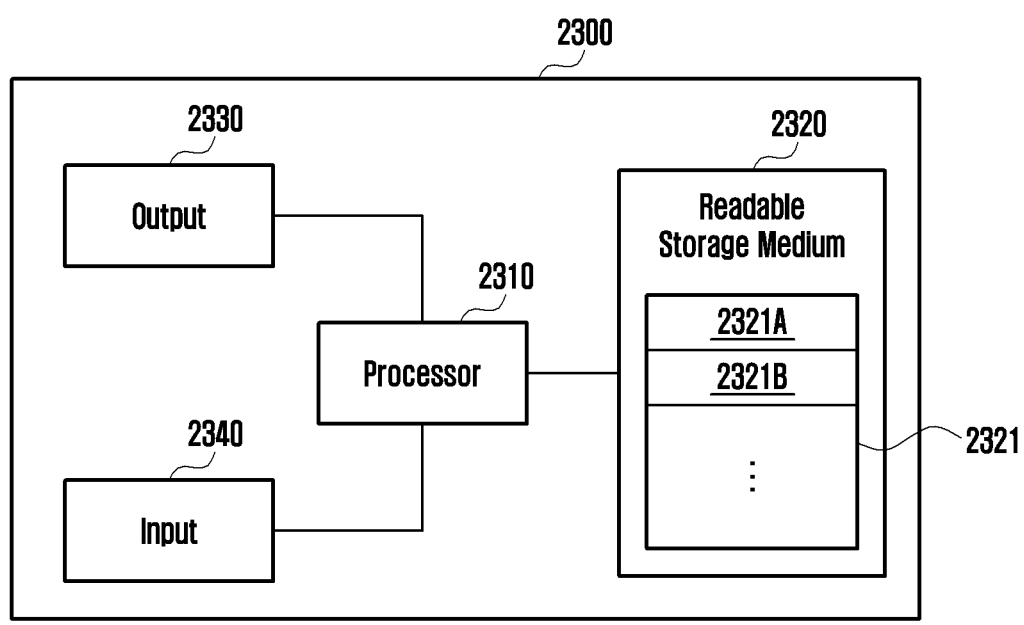
FIG. 23 shows a schematic block diagram of a communicating node device according to an embodiment of the present disclosure.

FIG. 23 schematically illustrates a block diagram of a computing system of a communicating node device (e.g., a base station or a user equipment) that may implement the present disclosure according to an embodiment of the present disclosure.

As illustrated in FIG. 23, the computing system 2300 comprises a processing unit 2310, a computer-readable storage medium 2320, an output interface 2330, and an input interface 2340. The computing system 2300 may execute the method for data transmission as described with reference to FIGS. 1-22.

Specifically, the processing unit 2310 for example may include a general microprocessor, an instruction set processor and/or a relevant chip set and/or a specific microprocessor (e.g., an application specific integrated circuit (ASIC)), and/or a digital signal processor (DSP), etc. The processing unit 2310 may also include a board-mounted memory for a caching purpose. The processing unit 2310 may be a single processing unit or a plurality of processing units for performing different actions of the method for data transmission as described with reference to FIGS. 1-22.

The computer-readable storage medium 2320 for example may be any medium capable of including, storing, transmitting, propagating, or transferring instructions. For example, the readable storage medium may include, but is not limited to, electrical, magnetic, optical, electromagnetic, infrared, or semiconductor system, apparatus, device or propagation medium. A specific example of the readable storage medium includes: a magnetic memory device, e.g., a magnetic tape or a hard disk (HDD); an optical memory device, e.g., optical disk (CD-ROM); a memory, e.g., a random-access memory (RAM) or a flash memory; and/or a wired/wireless communication link.

The computer readable storage medium 2320 may comprise a computer program 2321, which computer program 2321 may include code/computer-executable instructions, which, when being executed by the processing unit 2310, causes the processing unit 2310 to execute the method for data transmission as described above with reference to FIGS. 1-22 as well as any transformation thereof.

The computer program 2321 may be configured to include computer program code for example including computer program modules. For example, in an exemplary embodiment, the code in the computer program 2321 may include one or more program modules, e.g., including module 2321A, module 2321B, . . . . It should be noted that the manner of module partitions and the number thereof are not fixed; those skilled in the art may use an appropriate program module or a combination of program modules according to actual conditions; when a combination of these program modules is executed by the processing unit 2310, the processing unit 2310 is caused to be capable of executing the method for data transmission as described above with reference to FIGS. 1~22 as well as any transformation thereof.

The method according to the present disclosure and the apparatus involved have been described above with reference to the preferred embodiments. Embodiments of the present disclosure provide a method for data transmission suitable for new features of 5G and future systems, which may enhance the feedback efficiency of HARQ_ACK, and/or reduce the transmission collisions among different nodes more effectively.

Those skilled in the art may understand that the method illustrated above is only exemplary. The method of the present disclosure is not limited to the steps and sequences illustrated above, e.g., the steps executed by different parties may be processed in parallel. Besides, the steps of the method illustrated above may be executed through corresponding modules in a corresponding apparatus, or executed through a combination of hardware and program instructions. Those skilled in the art may be subjected to many variations and modifications according to the teachings in the embodiment.

It should be understood that the embodiments of the present disclosure may be implemented via software, hardware, or a combination of software and hardware. For example, various components inside the channel estimation apparatus or base station in the embodiments above may be implemented through various devices, including, but not limited to: an analog circuit device, a digital circuit device, a digital signal processing (DSP) circuit, a programmable processor, an application specific circuit (ASIC), a field programmable gate array (FPGA), and a programmable logic device (CPLD), etc.

In the present disclosure, the "base station" refers to the mobile communication data and the control switching center having a relatively large transmit power and a relatively broad coverage, including functions of resource allocation scheduling and data reception and transmission. "A source base station" and "a target base station" are termed relative to the switch process. "User equipment" refers to a user mobile terminal, including terminal devices such as mobile phones and laptops which may perform wireless communication with the base station or the micro base station.

Besides, the embodiments of the present disclosure as disclosed here may be implemented on a computer program product. More specifically, the computer program product refers to a product which has a computer readable medium, on which computer readable medium is encoded with computer program logic, such that when executed on a computing device, the computer program logic provides relevant operations to implement the technical solution of the present disclosure. When being executed on at least one processor of the computing system, the computer program logic causes the processor to execute the operation (method) as described in the embodiments of the present disclosure. Such settings of the present disclosure are typically provided as software, code and/or other data structure set or encoded on a computer readable medium such as an optical medium (e.g., CD-ROM), floppy disk or hard disk, etc., or other medium for firmware or microcode on one or more ROMs or RAMs or PROM chips, or software images, shared databases downloadable in one or more modules, etc. The software or firmware or such configurations may be installed on a computing device, causing one or more processors in the computing device to execute the technical solution as described in the embodiments of the present disclosure.

Although the present disclosure has been illustrated in conjunction with the preferred embodiments of the present disclosure, those skilled in the art will understand that the present disclosure may be subjected to various modifications, substitutions and alternations without departing from the spirit and scope of the present disclosure. Therefore, the present disclosure should not be limited by the embodiments above, but should be limited by the appended claims and their equivalents.

The invention claimed is:

1. A method performed by a user equipment (UE) in a wireless communication system, the method comprising:
performing a first data transmission in a listen-before-talk (LBT) mode;
obtaining hybrid automatic repeat request-acknowledgement (HARQ-ACK) information corresponding to a physical uplink shared channel (PUSCH) on which the first data transmission is performed;
adjusting a contention window size (CWS) for performing a second data transmission in the LBT mode based on the HARQ-ACK information in case that the PUSCH is transmitted over all resources allocated for the PUSCH; and
maintaining a previous CWS for performing the second data transmission in the LBT mode in case that the PUSCH is not transmitted over all resources allocated for the PUSCH.

2. The method according to claim 1,
wherein the HARQ-ACK information is associated with a code block group transport indicator (CBGTI) in case that data transmission is performed per code block group (CBG).

3. The method according to claim 2,
wherein the HARQ-ACK information is identified as an acknowledgement (ACK) in case that a bit of the CBGTI is configured with 0.

4. A user equipment (UE), comprising:
a transceiver; and
a controller configured to:
perform a first data transmission in a listen-before-talk (LBT) mode,
obtain hybrid automatic repeat request-acknowledgement (HARQ-ACK) information corresponding to a physical uplink shared channel (PUSCH) on which the data transmission is performed,
adjust a contention window size (CWS) for performing a second data transmission in the LBT mode based on the HARQ-ACK information in case that the PUSCH is transmitted over all resources allocated for the PUSCH, and
maintain a previous CWS for performing the second data transmission in the LBT mode in case that the PUSCH is not transmitted over all resources allocated for the PUSCH.

5. The UE according to claim 4,
wherein the HARQ-ACK information is associated with a code block group transport indicator (CBGTI) in case that data transmission is performed per code block group (CBG).

6. The UE according to claim 5,
wherein the HARQ-ACK information is identified as an acknowledgement (ACK) in case that a bit of the CBGTI is configured with 0.

* * * * *